United States Patent
Torisaki et al.

(10) Patent No.: US 12,316,653 B2
(45) Date of Patent: *May 27, 2025

(54) COMMUNICATION DEVICE, CONTROL DEVICE, STORAGE MEDIUM, AND SYSTEM FOR CONTROLLING RELAY OF DATA AMONG ELECTRONIC CONTROL UNITS BASED ON A TRAVELING STATE OF A VEHICLE

(71) Applicant: PANASONIC INTELLECTUAL PROPERTY CORPORATION OF AMERICA, Torrance, CA (US)

(72) Inventors: Yuishi Torisaki, Osaka (JP); Takamitsu Sasaki, Osaka (JP); Tomoyuki Haga, Nara (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/376,672

(22) Filed: Oct. 4, 2023

(65) Prior Publication Data

US 2024/0039932 A1    Feb. 1, 2024

Related U.S. Application Data

(63) Continuation of application No. 16/730,970, filed on Dec. 30, 2019, now Pat. No. 11,824,871, which is a
(Continued)

(30) Foreign Application Priority Data

Jul. 19, 2017  (JP) .................... 2017-139703
Apr. 25, 2018  (JP) .................... 2018-084424

(51) Int. Cl.
*H04L 9/40*        (2022.01)
*G07C 5/00*        (2006.01)
(Continued)

(52) U.S. Cl.
CPC .......... *H04L 63/1416* (2013.01); *G07C 5/008* (2013.01); *G07C 5/0808* (2013.01);
(Continued)

(58) Field of Classification Search
CPC .......... H04L 63/1416; H04L 12/40013; H04L 12/40026; H04L 63/0236; H04L 63/10;
(Continued)

(56) References Cited

U.S. PATENT DOCUMENTS 6,604,038 B1    8/2003  Lesesky et al.
9,866,563 B2 *  1/2018  Teshler ............... H04L 63/1433
(Continued)

FOREIGN PATENT DOCUMENTS

EP    3133774    2/2017
EP    3142289    3/2017
(Continued)

OTHER PUBLICATIONS

International Search Report of PCT Application No. PCT/JP2018/018628, dated Aug. 7, 2018, together with an English language translation.
(Continued)

*Primary Examiner* — Bryan F Wright
(74) *Attorney, Agent, or Firm* — Greenblum & Bernstein, P.L.C.

(57) ABSTRACT

A module for a vehicle includes: a first communication module that transmits and receives first data to and from a first in-vehicle module; a second communication module that transmits and receives second data to and from a second in-vehicle module; and a control module that controls relay
(Continued)

of third data among the first communication module and the second communication module. In a case where reception data received by the control module from the first or second communication module is unauthorized, the control module stops relaying the third data in accordance with a traveling state of the vehicle satisfying a predetermined condition, The traveling state includes: the vehicle being stopped; a vehicle speed being at or below a predetermined speed; brakes being applied; a hazard indicator being on; a driver being in a state capable of driving; and/or self-driving functions being in an off state.

18 Claims, 20 Drawing Sheets

Related U.S. Application Data continuation of application No. PCT/JP2018/018628, filed on May 15, 2018.

(51) Int. Cl.
*G07C 5/08* (2006.01)
*H04L 12/40* (2006.01)
*H04W 80/02* (2009.01)

(52) U.S. Cl.
CPC .. *H04L 12/40013* (2013.01); *H04L 12/40026* (2013.01); *H04L 63/0236* (2013.01); *H04L 63/10* (2013.01); *H04L 63/126* (2013.01); *H04W 80/02* (2013.01); *H04L 2012/40215* (2013.01); *H04L 2012/40273* (2013.01)

(58) Field of Classification Search
CPC ......... H04L 63/126; H04L 2012/40215; H04L 2012/40273; H04L 12/4625; H04L 63/102; H04L 12/40006; H04L 12/28; H04L 12/66; G07C 5/008; G07C 5/0808; H04W 80/02; H04W 12/125; H04W 12/08; H04W 4/48; B60R 25/00

USPC .......................................................... 726/23
See application file for complete search history.

(56) References Cited

U.S. PATENT DOCUMENTS

| | | | |
|---|---|---|---|
| 2008/0258890 A1* | 10/2008 | Follmer | ................. G08G 1/052 340/439 |
| 2009/0271063 A1 | 10/2009 | Yasue et al. | |
| 2015/0191151 A1 | 7/2015 | Ben Noon et al. | |
| 2016/0323287 A1 | 11/2016 | Kishikawa et al. | |
| 2017/0013005 A1* | 1/2017 | Galula | ................ H04L 63/1425 |
| 2017/0026198 A1* | 1/2017 | Ochiai | ................ H04L 12/6418 |
| 2017/0104865 A1 | 4/2017 | Skelton | |
| 2017/0171375 A1* | 6/2017 | Kamata | ........... H04M 1/724098 |
| 2018/0367546 A1 | 12/2018 | Miyashita | |
| 2020/0015075 A1 | 1/2020 | Takatsuka | |

FOREIGN PATENT DOCUMENTS

| | | |
|---|---|---|
| EP | 3148236 | 3/2017 |
| EP | 3657739 | 5/2020 |
| JP | 2004-349961 | 12/2004 |
| JP | 2008-150186 | 7/2008 |
| JP | 2014-113860 | 6/2014 |
| JP | 2016-134913 | 7/2016 |
| JP | 2016-148939 | 8/2016 |
| WO | 2014/061021 | 4/2014 |
| WO | 2014/199687 | 12/2014 |
| WO | 2016/204081 | 12/2016 |

OTHER PUBLICATIONS

The Extended European Search Report from the European Patent Office (EPO) dated Mar. 27, 2020 for the related European Patent Application No. 18835493.0.
The Extended European Search Report dated Sep. 28, 2021 for the related European Patent Application No. 21192640.7.

* cited by examiner

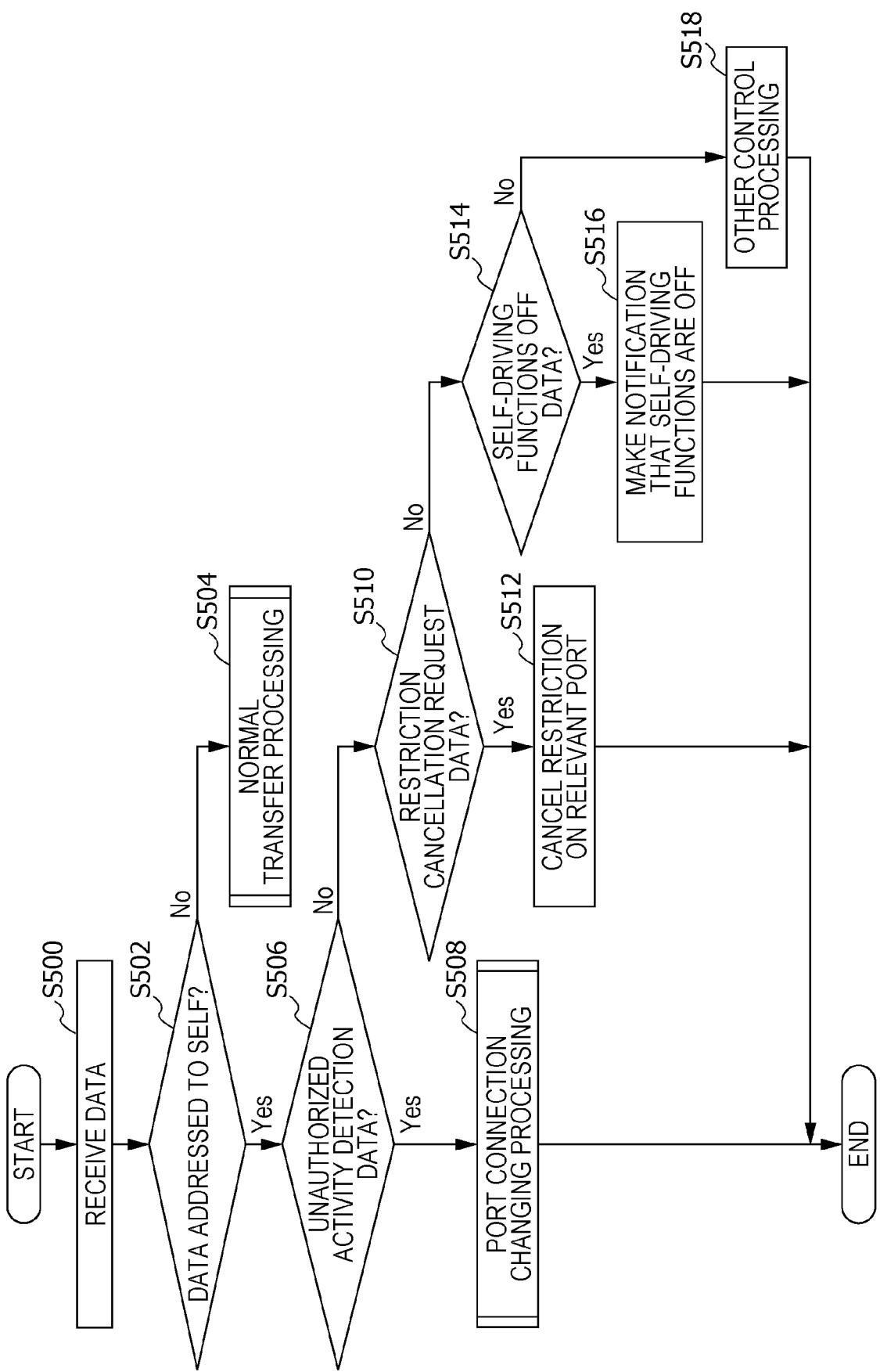

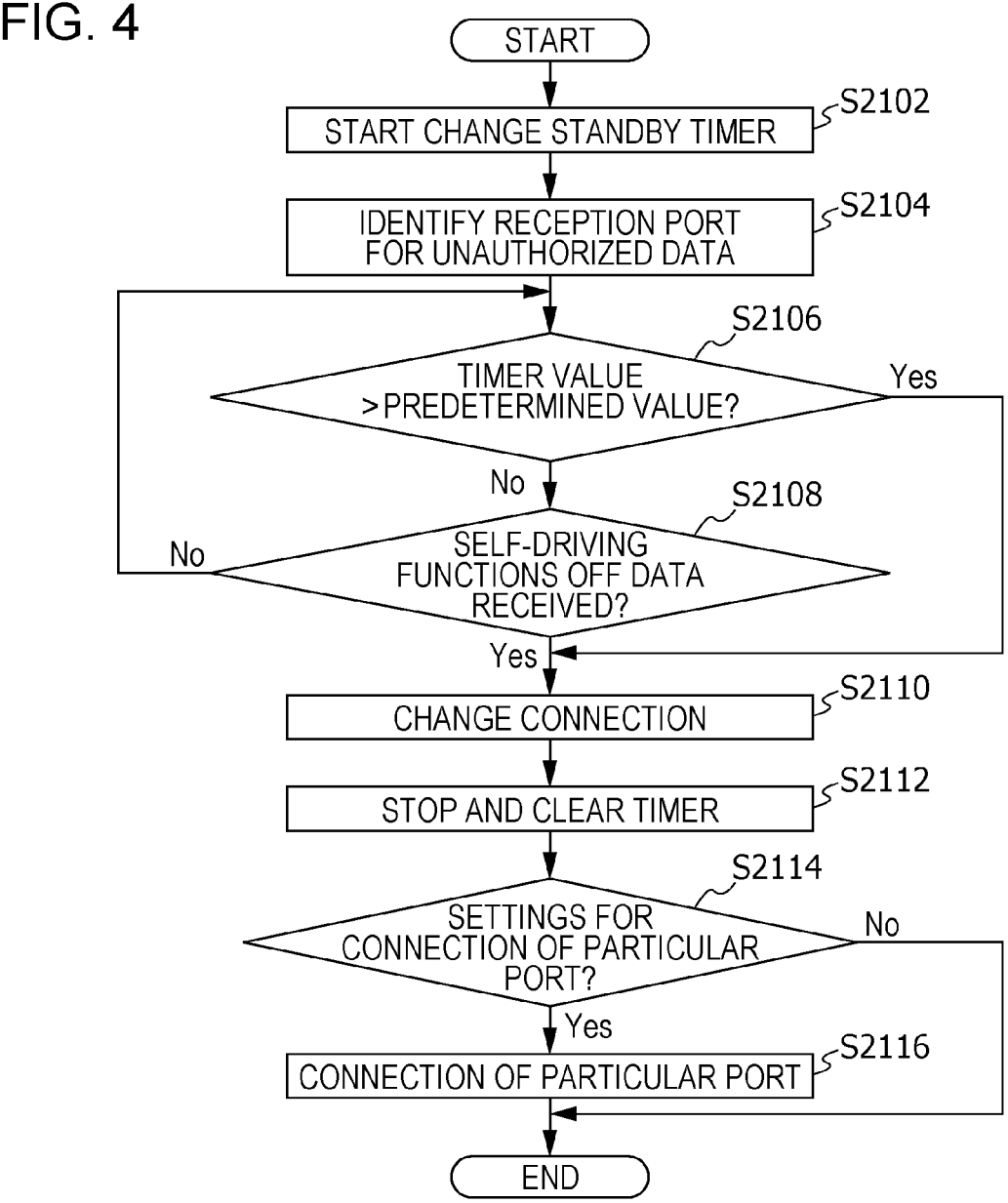

| TRANSMISSION / RECEPTION | PORT A | PORT B | PORT C | PORT D | PORT E |
|---|---|---|---|---|---|
| PORT A |  | • | • | • | • |
| PORT B | • |  | • | – | – |
| PORT C | • | – |  | – | – |
| PORT D | • | – | – |  | – |
| PORT E | – | – | – | – |  |

| TRANSMISSION / RECEPTION | PORT A | PORT B | PORT C | PORT D | PORT E |
|---|---|---|---|---|---|
| PORT A |  | • | • | • | • |
| PORT B | • |  | • | – | – |
| PORT C | • | – |  | – | – |
| PORT D | • | – | – |  | – |
| PORT E | • | – | – | – |  |

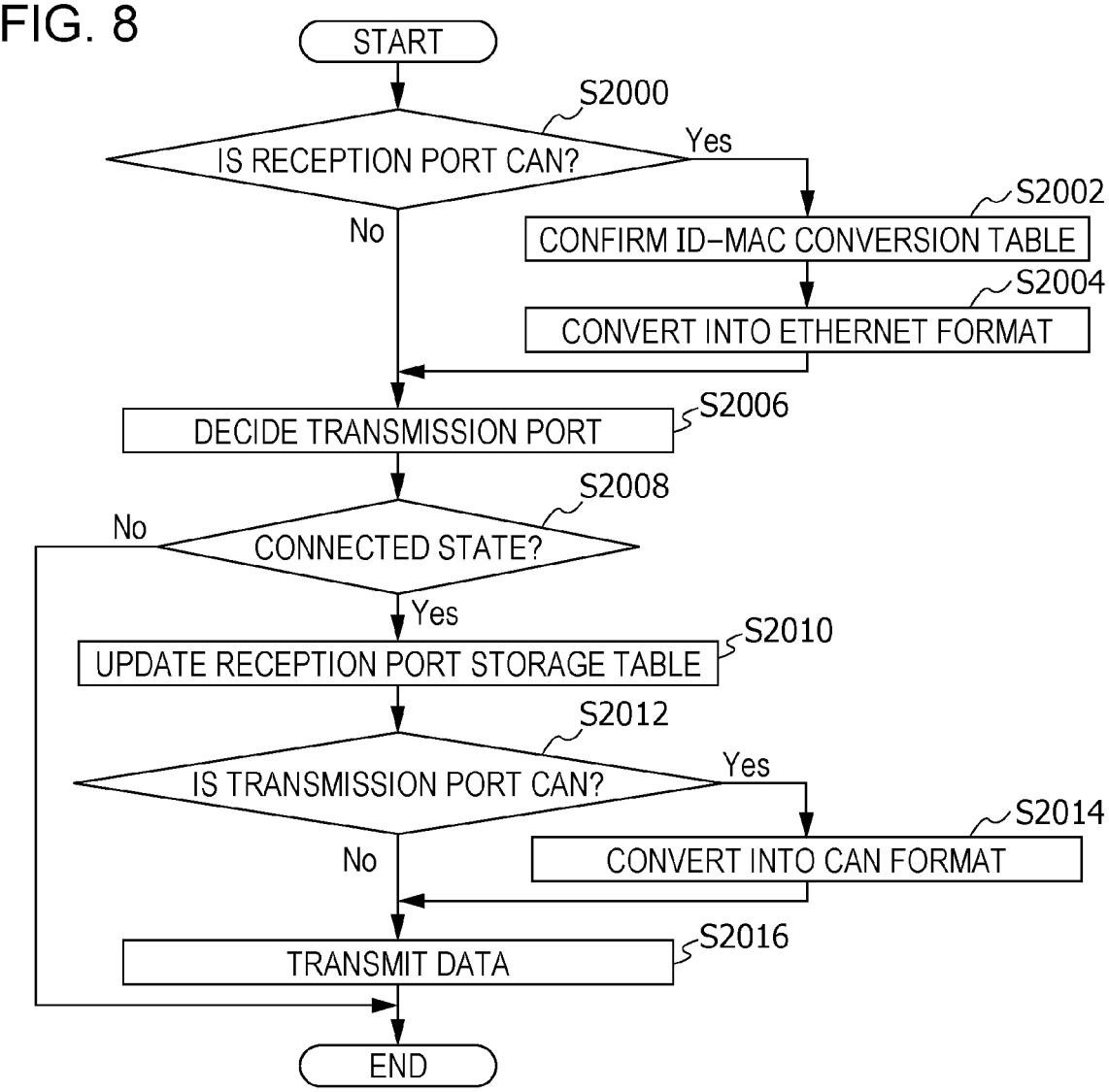

| TRANSMISSION PORT | ID | RECEPTION MAC ADDRESS |
|---|---|---|
| PORT E | 0xFF | MAC ADDRESS A |
| PORT B | 0x12 | MAC ADDRESS B |
| PORT B | 0x18 | MAC ADDRESS B |
| PORT C | 0x1A | MAC ADDRESS C |

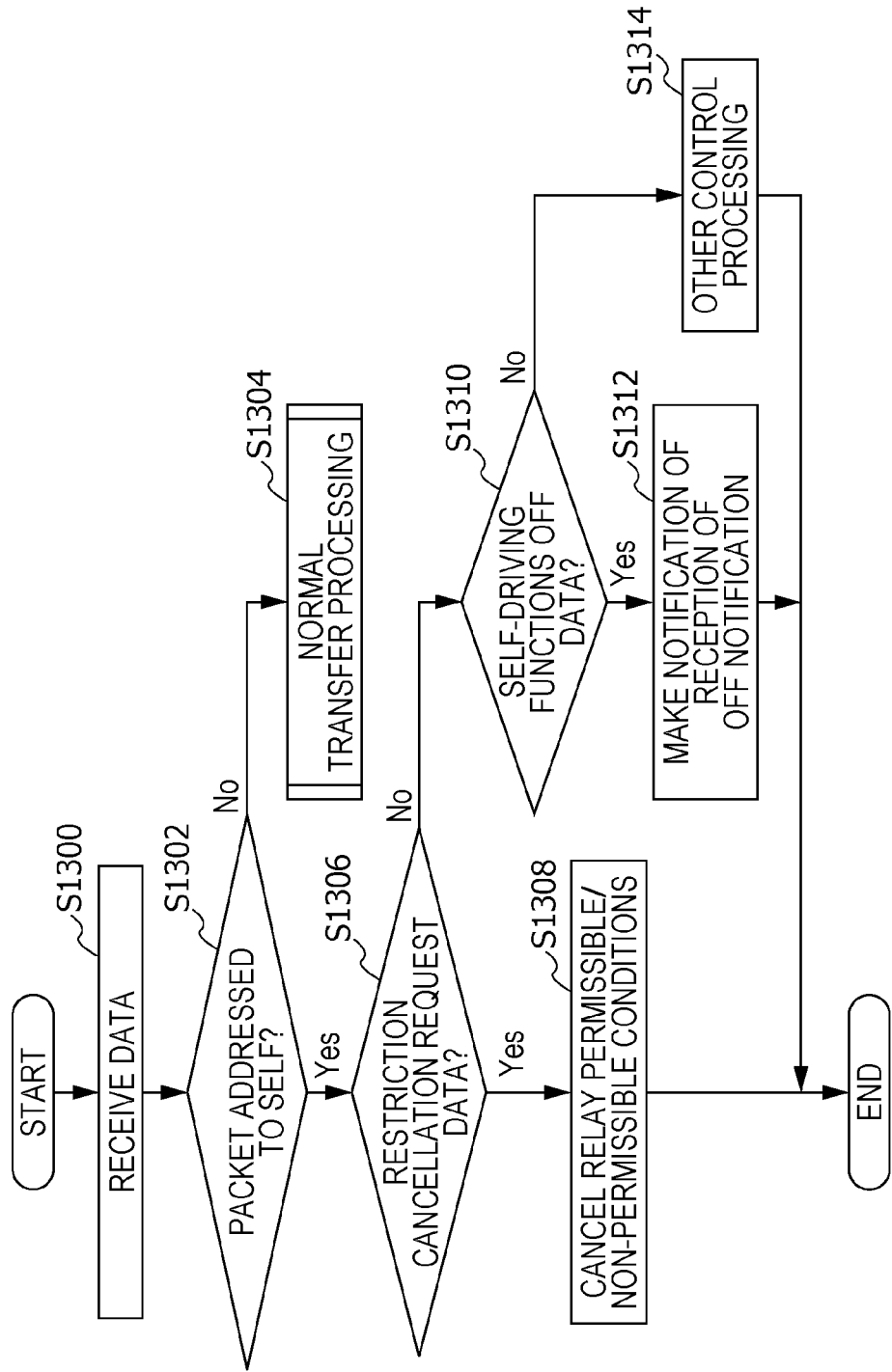

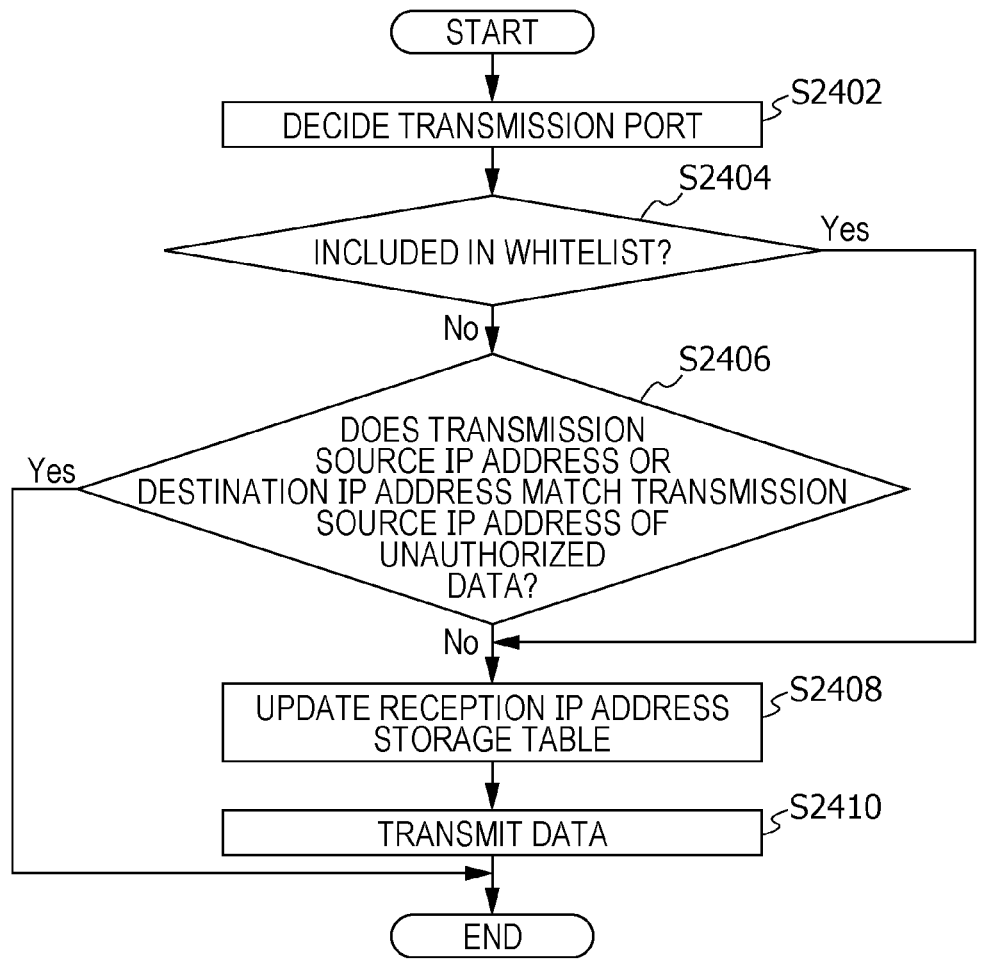

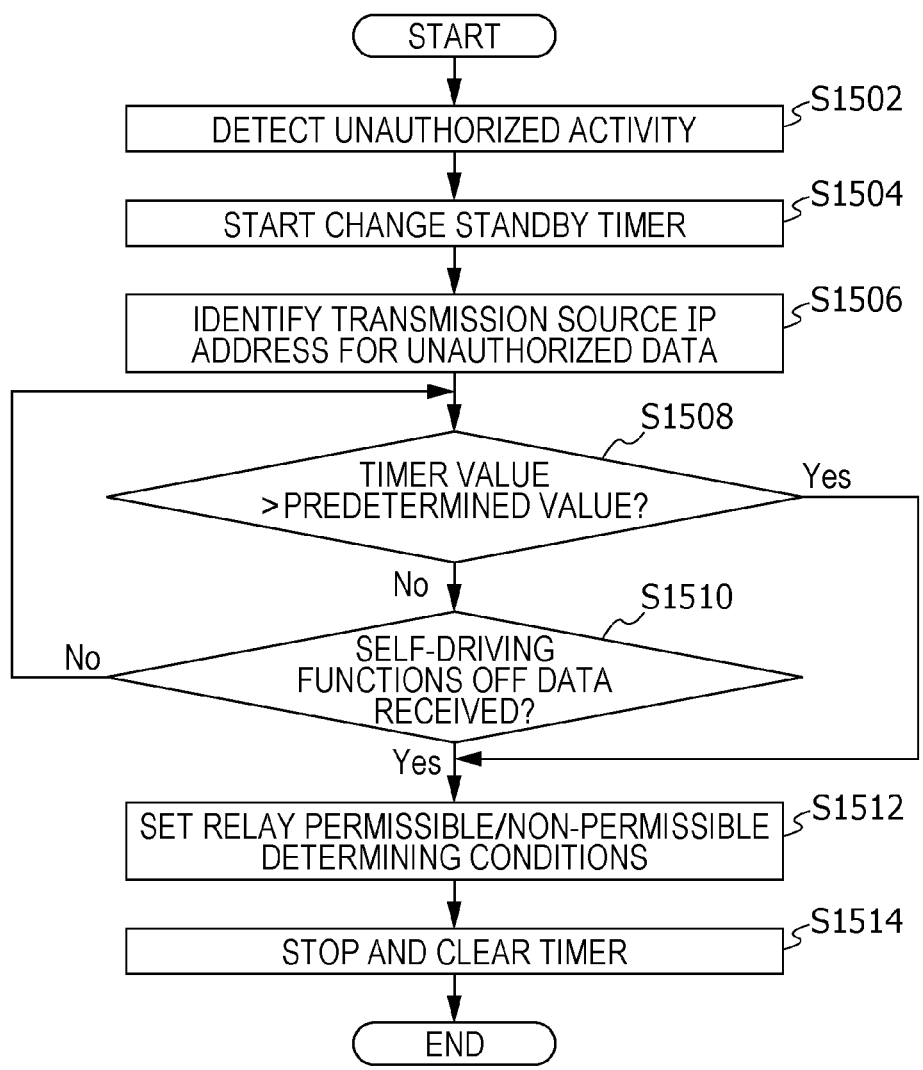

COMMUNICATION DEVICE, CONTROL DEVICE, STORAGE MEDIUM, AND SYSTEM FOR CONTROLLING RELAY OF DATA AMONG ELECTRONIC CONTROL UNITS BASED ON A TRAVELING STATE OF A VEHICLE

CROSS-REFERENCE TO RELATED APPLICATIONS

This is a continuation of U.S. patent application Ser. No. 16/730,970, filed Dec. 30, 2019, which is a continuation of International Pat. Appl. No. PCT/JP2018/018628, filed May 15, 2018, which claims the benefit of priority of Japanese Pat. Appl. No. 2018-084424, filed Apr. 25, 2018, and of Japanese Pat. Appl. No. 2017-139703, filed Jul. 19, 2017. The entire disclosure of each of the above-identified documents, including the specification, drawings, and claims, is incorporated herein by reference in its entirety.

BACKGROUND

1. Technical Field

The present disclosure relates to an in-vehicle relay device, a relay method, and a recording medium storing a program, for relaying data on an in-vehicle network.

2. Description of the Related Art

In recent years, in-vehicle networks are installed in vehicles. For example, Japanese Unexamined Patent Application Publication No. 2004-349961 discloses an in-vehicle relay device that relays in-vehicle networks. The in-vehicle relay device in Japanese Unexamined Patent Application Publication No. 2004-349961 is made up of a router or gateway, and is configured to monitor the state of an electronic control unit (ECU) that is the object of transmission of data, and voltage, and to control transmission. The in-vehicle relay device made up of a gateway in Japanese Unexamined Patent Application Publication No. 2004-349961 monitors battery voltage at a voltage detecting unit. In a case where a drop in voltage is detected, the in-vehicle relay device stops transmission or changes the destination of transmission with regard to data transmission of which a particular ECU is the destination of transmission. For example, in a case of having determined that there is trouble in operations of the ECU regarding which drop in voltage has been detected on the power source line, the in-vehicle relay device stops transmission of data of which that ECU is the destination of transmission.

SUMMARY

In a case where any in-vehicle equipment that transmits data is attacked and transmits unauthorized data, the in-vehicle relay device according to Japanese Unexamined Patent Application Publication No. 2004-349961 is not monitoring the in-vehicle equipment that is the transmission source of data, and accordingly can detect neither the attack nor the unauthorized activity. Accordingly, the in-vehicle relay device cannot stop control by the in-vehicle device transmitting unauthorized data.

One non-limiting and exemplary embodiment provides an in-vehicle relay device, relay method, and recording medium storing a program, that stops unauthorized control by an in-vehicle device that is connected to an in-vehicle device and that has been attacked.

In one general aspect, the techniques disclosed here feature an in-vehicle relay device for a vehicle. The in-vehicle relay device includes a first communication circuit that transmits and receives first data to and from a first in-vehicle equipment in the vehicle, a second communication circuit that transmits and receives second data to and from a second in-vehicle equipment in the vehicle, and a control circuit that controls relay of third data among the first communication circuit and the second communication circuit. In a case where reception data received by the control circuit from the first communication circuit or the second communication circuit is unauthorized, the control circuit stops relaying the third data in accordance with a traveling state of the vehicle.

According to the in-vehicle relay device and so forth according to the present disclosure, unauthorized control by in-vehicle equipment that is connected to in-vehicle equipment and that has been attacked can be stopped.

It should be noted that the above-described general or specific embodiments may be implemented as a system, a device, a method, an integrated circuit, a computer program, or a recording medium such as a computer-readable recording disk or the like, and may be realized by any selective combination of system, device, method, integrated circuit, computer program, and recording medium. The computer-readable storage medium includes non-volatile recording media such as CD-ROM (Compact Disc-Read Only Memory) or the like, for example.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a flowchart illustrating an example of processing by the first in-vehicle relay device according to the first embodiment;

FIG. 4 is a flowchart illustrating an example of port connection changing processing by the first in-vehicle relay device according to the first embodiment;

FIG. 5 is a diagram illustrating an example of a reception port storage table stored in a storage unit of the first in-vehicle relay device according to the first embodiment;

FIG. 8 is a flowchart illustrating an example of normal transfer processing by the first in-vehicle relay device according to the first embodiment;

FIG. 9 is a diagram illustrating an example of an ID-MAC conversion table stored in the storage unit of the first in-vehicle relay device according to the first embodiment;

FIG. 22 is a flowchart illustrating an example of processing by the first in-vehicle relay device according to the third embodiment;

FIG. 23 is a flowchart illustrating an example of normal transfer processing by the first in-vehicle relay device according to the third embodiment;

FIG. 24 is a diagram illustrating an example of reception IP address storage table stored in a storage unit of the first in-vehicle relay device according to the third embodiment;

FIG. 25 is a flowchart illustrating an example of unauthorized activity detecting processing by the first in-vehicle relay device according to the third embodiment.

DETAILED DESCRIPTION

Findings of the Inventors

Figure 1:
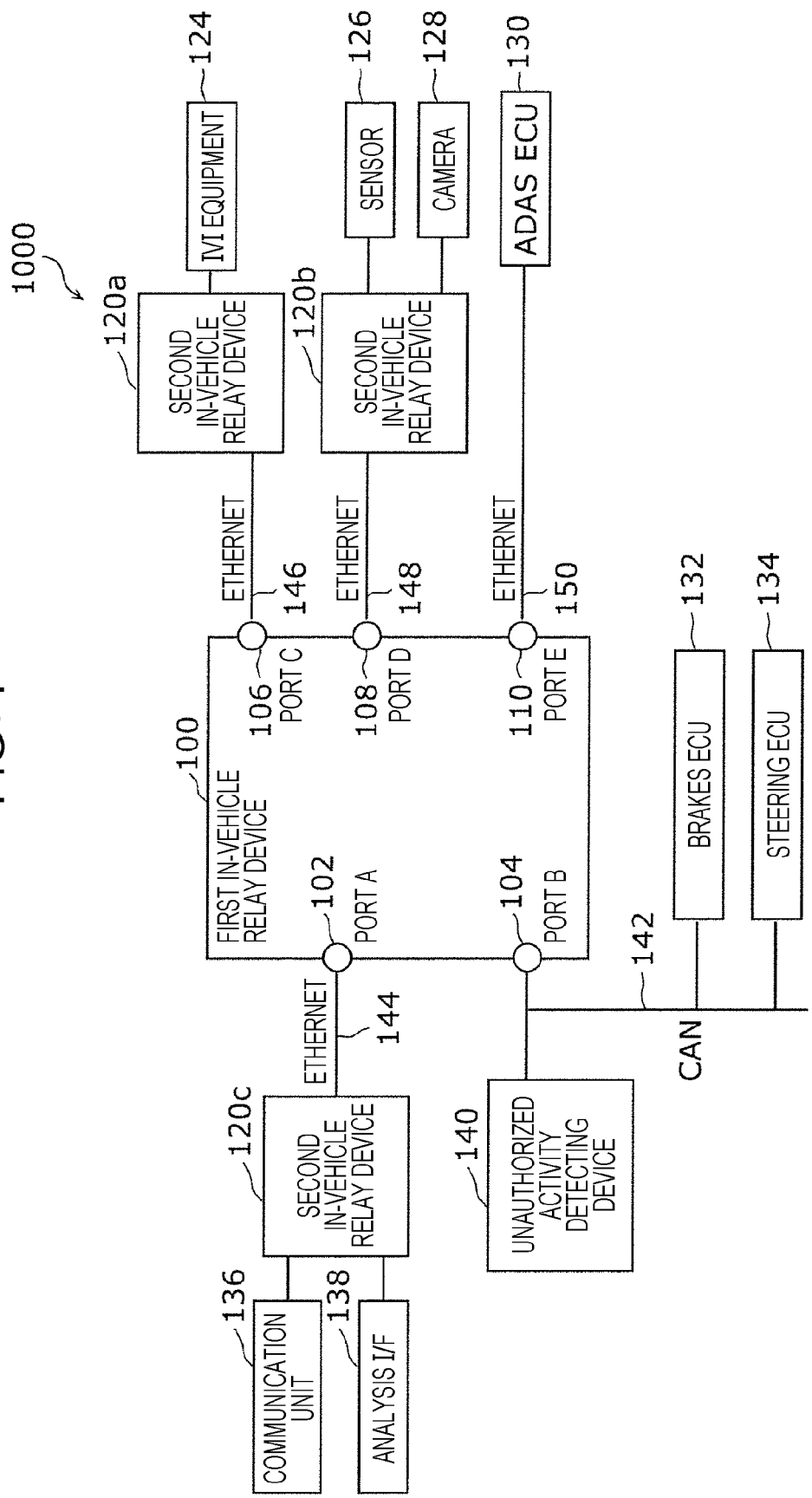
FIG. 1 is a block diagram illustrating an example of the functional configuration of an in-vehicle network that has an in-vehicle relay device according to a first embodiment.

In-vehicle networks installed in automobiles continue to advance from year to year. For example, in addition to in-vehicle networks such as conventional controller area networks (CAN), as of recent, automobiles that partially apply in-vehicle Ethernet (registered trademark) have appeared on the market. It is expected that the proportion of Ethernet (registered trademark) in in-vehicle networks will increase from now on. Furthermore, there are more cases where in-vehicle networks are connected to external networks such as cellular phone networks or the like. It is thought that connectivity between in-vehicle networks and external networks will be indispensable for the advent of self-driving cars, for transmission and reception of road conditions, high-precision map information, and so forth.

Also, advanced driver assistance systems (ADAS), of which brake assist, automatic parking, and lane departure prevention assist are representative have become commonplace, and vehicle body control ECUs such as brake ECUs have come to be controlled by control data sent over the in-vehicle network.

Thus, there is an increased risk of cyberattacks on automobiles, along with the increase of connection to external networks and the increase in vehicle body control via network. For example, actual instances of attacks where the steering wheel or brakes of a moving car were operated via a cellular phone network have been reported. Accordingly, there is need for security in automobiles, and it is thought that security measures will be necessary for in-vehicle networks as well.

Conventional in-vehicle relay devices are configured to monitor the state of voltage at ECUs that are the object of data transmission and control transmission, as disclosed in Japanese Unexamined Patent Application Publication No. 2004-349961. The in-vehicle relay device made up of a gateway that is disclosed in Japanese Unexamined Patent Application Publication No. 2004-349961 monitors battery voltage using a voltage detecting unit. In a case where a drop in voltage is detected, with regard to data transmission of which a particular ECU is the transmission destination, this in-vehicle relay device stops transmission of that control unit or changes the transmission destination. For example, in a case of having judged that there is trouble in operations of an ECU regarding which drop in voltage on the power supply line has been detected, the in-vehicle relay device stops transmission of data of which the transmission destination is that ECU.

However, in a case of any in-vehicle equipment that transmits data being attacked and transmitting unauthorized data, the above-described conventional in-vehicle relay device is not monitoring the in-vehicle equipment that is the transmission source of data, and accordingly can detect neither the attack nor the unauthorized activity. Accordingly, the in-vehicle relay device cannot stop control by the in-vehicle equipment transmitting unauthorized data.

Also, conventional in-vehicle relay devices perform transfer stopping determination using only the transmission destination ID, so transfer of all data is stopped to the in-vehicle equipment of the transmission destination ID regarding which stopping transfer has been decided. Accordingly, the in-vehicle equipment of the transmission destination ID regarding which stopping transfer has been decided is not capable of receiving transfer of diagnostic commands from a diagnostics device or diagnostics server, or commands necessary for recovery.

Also, a situation can occur in conventional in-vehicle relay devices where, in a case of transmitting data from unauthorized in-vehicle equipment, data is not transferred to an in-vehicle equipment where transfer of data has been stopped, but data is transferred to devices where data transfer has not been stopped. Accordingly, attacks by unauthorized data of which the transmission source is an unauthorized in-vehicle equipment cannot be prevented in a sure manner.

Accordingly, the present inventors have studied technology that, in a case where there is a possibility that in-vehicle equipment has been attacked in an in-vehicle network and is transmitting unauthorized data, stops unauthorized control by that device. For example, the present inventors have studied technology that, in a case where there is a possibility that in-vehicle equipment device has been attacked in an in-vehicle network and is transmitting unauthorized data, suppresses effects on other in-vehicle equipment while enabling analysis or recovery. Thus, the present inventors have conceived the following technology.

An in-vehicle relay device according to an aspect of the present disclosure is an in-vehicle relay device for a vehicle. The in-vehicle relay device includes a first communication circuit that transmits and receives first data to and from a first in-vehicle equipment in the vehicle, a second communication circuit that transmits and receives second data to and from a second in-vehicle equipment in the vehicle, and a control circuit that controls relay of third data among the first communication circuit and the second communication circuit. In a case where reception data received by the control circuit from the first communication circuit or the second communication circuit is unauthorized, the control circuit stops relaying the third data in accordance with a traveling state of the vehicle.

According to the above configuration, in a case where reception data is unauthorized, the in-vehicle relay device stops relaying of data between the first communication circuit and the second communication circuit, thereby stopping transmission of data transmitted from the unauthorized in-vehicle equipment, and unauthorized control by the unauthorized in-vehicle equipment can be suppressed. Further, the in-vehicle relay device stops relaying in accordance with the traveling state of the vehicle. Accordingly, the traveling of the vehicle can be suppressed from becoming unstable due to the relaying being stopped.

At least one of the first communication circuit and the second communication circuit may transmit and receive to and from the in-vehicle equipment in the vehicle, via a network.

According to the above configuration, multiple in-vehicle equipment can be connected to a single communication circuit via a network. This enables the number of in-vehicle equipment that the in-vehicle relay device relays to be increased.

The in-vehicle relay device may further include a first port for connection of the first communication circuit and the first in-vehicle equipment, and a second port for connection of the second communication circuit and the second in-vehicle equipment. The control circuit may stop the relaying by blocking a connection between the first port and the second port.

According to the above configuration, the in-vehicle relay device stops relaying of data among the ports in a case where the reception data is unauthorized, and stops transfer of data with the unauthorized in-vehicle equipment. Accordingly, the in-vehicle relay device suppresses unauthorized control by corrupt in-vehicle equipment, and also suppresses effects of the unauthorized in-vehicle equipment on other in-vehicle equipment. For example, stopping relaying of data among ports enables stopping transfer of data with in-vehicle equipment connected to a bus-based network such as a CAN.

The third data, of which the control circuit may stop the relaying, may include a MAC address of which a destination or a transmission source is the first in-vehicle equipment or the second in-vehicle equipment that is a source of the reception data that is unauthorized.

According to the above configuration, in a case where reception data is unauthorized, relaying is stopped of data including a MAC address of which a destination or transmission source is the in-vehicle equipment that is the transmission source of the reception data that is unauthorized. Thus, the in-vehicle relay device can stop transfer of data with an unauthorized in-vehicle equipment. For example, such stopping of relaying enables stopping transfer of data with in-vehicle equipment connected to Ethernet (registered trademark).

The third data, of which the control circuit may stop the relaying, may include an IP address of which a destination or a transmission source is the first in-vehicle equipment or the second in-vehicle equipment that is a source of the reception data that is unauthorized.

According to the above configuration, in a case where reception data is unauthorized, relaying is stopped of data including an IP address of which a destination or transmission source is the in-vehicle equipment that is the transmission source of the reception data that is unauthorized. Thus, the in-vehicle relay device can stop transfer of data with an unauthorized in-vehicle equipment. For example, such stopping of relaying enables stopping transfer of data with in-vehicle equipment connected to Ethernet (registered trademark). Further, even if multiple in-vehicle equipment are connected to one communication circuit, the IP address enables the transmission source of the data to be identified. Thus, transfer of data with individual in-vehicle equipment can be stopped.

The control circuit may receive, from the first communication circuit or the second communication circuit, unauthorized activity detection data notifying that the reception data is unauthorized, and stop the relaying after a predetermined amount of time has elapsed following a reception of the unauthorized activity detection data.

According to the above configuration, there is a predetermined amount of time from the in-vehicle relay device receiving the unauthorized activity detection data until relaying is stopped. Accordingly, the operator of the vehicle in which the in-vehicle relay device is installed can switch control of the vehicle. For example, the operator can turn the self-driving functions of the vehicle off, and switch to manual driving. In a case where an unauthorized in-vehicle equipment is an ECU related to self-driving functions, for example, suddenly stopping relay of data from that ECU could possibly put the vehicle in an uncontrolled state. The in-vehicle relay device enables an uncontrolled state of the vehicle to be suppressed.

The vehicle may include a self-driving function, with the control circuit: receiving, from the first communication circuit or the second communication circuit, unauthorized activity detection data notifying that the reception data is unauthorized; and stopping the relaying upon receiving data notifying, as the traveling state of the vehicle, that the self-driving function is in an off state, following a reception of the unauthorized activity detection data.

According to the above configuration, the in-vehicle relay device stops relaying upon receiving data notifying that the self-driving functions are in an off state. In a case where an unauthorized in-vehicle equipment is an ECU related to self-driving functions, for example, suddenly stopping relay of data from that ECU could possibly put the vehicle in an uncontrolled state. The in-vehicle relay device enables an uncontrolled state of the vehicle to be suppressed.

The unauthorized activity detection data may include information of data regarding an unauthorized activity that has been detected, and information of a transmission source of the data regarding the unauthorized activity that has been detected.

According to the above configuration, the in-vehicle relay device can identify the in-vehicle equipment where unauthorized activity has been detected by receiving unauthorized activity detection data.

The in-vehicle relay device may further include a memory that stores, in a correlated manner, the information of the data regarding the unauthorized activity that has been detected, and the information of the transmission source of the data regarding the unauthorized activity that has been detected. The control circuit may identify the transmission source of the data regarding the unauthorized activity that has been detected, based on the information of the data regarding the unauthorized activity that has been detected and the information of the transmission source of the data regarding the unauthorized activity that has been detected, which are stored in the memory.

According to the above configuration, the in-vehicle relay device can retrospectively identify the in-vehicle equipment where unauthorized activity has been detected, by referencing the memory.

The in-vehicle relay device may further include a third communication circuit that transmits and receives fourth data to and from a third in-vehicle equipment in the vehicle. The control circuit may, in a second case where the reception data is received from the first communication circuit and is unauthorized, stop the relaying of the third data between the first communication circuit and the second communication circuit, and continue relaying of fifth data between the first communication circuit and the third communication circuit.

According to the above configuration, relaying of data between the first communication circuit where reception data is unauthorized and the third communication circuit is used, in a state where relaying of data between the first communication circuit and the second communication circuit is stopped, thereby facilitating analysis of the unauthorized in-vehicle equipment or handling by updating software/firmware.

Diagnostics equipment that diagnosis a state of the first in-vehicle equipment may be connected to the third in-vehicle equipment.

According to the above configuration, diagnosis or updating of software by diagnostics equipment can be performed on the in-vehicle equipment thought to have been unauthorized, even after relaying is stopped.

The third in-vehicle equipment may be a communication circuit that is configured for external communication from the vehicle.

According to the above configuration, diagnosis or updating of software by external communication can be performed on the in-vehicle equipment thought to have been unauthorized, even after relaying is stopped.

The control circuit, in the case where the reception data received from the first communication circuit or the second communication circuit is unauthorized, may resume the relaying upon receiving, from the first communication circuit or the second communication circuit, data requesting cancellation of stopping the relaying.

According to the above configuration, in a case where reception data is unauthorized, the in-vehicle relay device handles the unauthorized in-vehicle equipment appropriately, and thereafter resumes relaying, and thus can return to the normal state before the unauthorized activity was detected.

The in-vehicle relay device may further include a memory that stores a relay state of relaying the third data among the first in-vehicle equipment and the second in-vehicle equipment. At a time of turning on power of the in-vehicle relay device, the control circuit may maintain or stop relay of the third data among the first in-vehicle equipment and the second in-vehicle equipment, based on the relay state stored in the memory.

According to the above configuration, in a case where the power is turned off and thereafter the power is turned on, the in-vehicle relay device can set the relay state to the same state as before the power going off, and maintaining of relaying or stopping of relaying can be made to be the same before the power going off. The in-vehicle relay device can prevent relaying of unauthorized data, regarding which relaying had been stopped, from being unintentionally resumed by the power being turned off and on.

A relay method according to an aspect of the present disclosure is a relay method of relaying transmission and reception of data among in-vehicle equipment. The method includes transmitting and receiving first data to and from a first in-vehicle equipment in a vehicle, transmitting and receiving second data to and from a second in-vehicle equipment in the vehicle, relaying third data among the first communication circuit and the second communication circuit, and stopping, by a control circuit in a case where the first data of the first in-vehicle equipment or the second data of the second in-vehicle equipment is unauthorized, the relaying of the third data in accordance with a traveling state of the vehicle.

A non-transitory computer-readable medium includes a program according to an aspect of the present disclosure that causes a computer to transmit and receive first data to and from a first in-vehicle equipment in a vehicle, transmit and receive second data to and from a second in-vehicle equipment in the vehicle, relay third data among the first in-vehicle equipment and the second in-vehicle equipment, and stop, in a case where the first data of the first in-vehicle equipment or the second data of the second in-vehicle equipment is unauthorized, the relaying of the third data in accordance with a traveling state of the vehicle. According to the above aspect, the same advantages as the in-vehicle relay device according to an aspect of the present disclosure can be obtained.

An in-vehicle relay device according to another aspect of the present disclosure includes a first reception unit that receives data from a first network, a first transmission unit that transmits data to the first network, a second reception unit that receives data from a second network, a second transmission unit that transmits data to the second network, and a control unit that controls relaying of data between the first network and the second network. In a case where first data received from the first reception unit is unauthorized activity detection data for notifying that unauthorized activity has been detected, the control unit stops relaying of the first network and the second network.

According to the above configuration, when receiving unauthorized activity detection data, the in-vehicle relay device stops relay of data with the network that has received the unauthorized activity detection data, thereby stopping transfer of data transmitted from unauthorized in-vehicle equipment such as an ECU or the like included in that network, and accordingly unauthorized control by unauthorized in-vehicle equipment can be suppressed.

In the in-vehicle relay device according to another aspect of the present disclosure, in a case where the first data is the unauthorized activity detection data, the control unit may stop relaying of the first network and the second network after a predetermined amount of time has elapsed following reception of the first data.

According to the above configuration, the operator of the vehicle in which the in-vehicle relay device is installed can turn the self-driving functions or the like off and switch to manual driving, in a predetermined amount of time from the unauthorized activity detection data being received until relaying of data with the network where unauthorized activity detection data has been received is stopped. For example, in a case where an unauthorized in-vehicle equipment included in a network that has received unauthorized activity detection data is an ECU related to self-driving functions, for example, the possibility of the vehicle going to an uncontrolled state by suddenly stopping relay of data from that ECU can be reduced.

In the in-vehicle relay device according to another aspect of the present disclosure, in a case where the first data is the unauthorized activity detection data, the control unit may stop relaying of the first network and the second network in a case of having received second data notifying that self-driving functions are in an off state from the first reception unit or the second reception unit, after having received the first data.

The in-vehicle relay device according to another aspect of the present disclosure may further include a third reception unit that receives data from a third network, and a third transmission unit that transmits data to the third network. In a case where the first data is the unauthorized activity detection data, the control unit may stop relaying of the first network and the second network in a case of having received second data notifying that self-driving functions are in an off state from the third reception unit, after having received the first data.

According to the above configuration, relaying of the first network and second network is stopped after having received second data notifying that the self-driving functions are in an off state, so in a case where an unauthorized in-vehicle equipment included in a network that has received unauthorized activity detection data is an ECU related to self-driving functions, for example, the possibility of the vehicle going to an uncontrolled state by suddenly stopping relay of data from that ECU can be reduced.

The in-vehicle relay device according to another aspect of the present disclosure may further include a third reception unit that receives data from a third network, and a third transmission unit that transmits data to the third network. In a case where the first data is unauthorized activity detection data, the control unit may stop relaying of the first network and the second network, and continue relaying of the first network and the third network.

According to this configuration, handling by analysis or updating software/firmware after connection restriction is facilitated.

In the in-vehicle relay device according to another aspect of the present disclosure, a diagnostics equipment that performs communication with in-vehicle equipment connected to the first network, and diagnoses the state of the in-vehicle equipment, may be connected to the third network.

According to the above configuration, diagnosis or updating of software by diagnostic equipment can be performed on the in-vehicle equipment thought to have been unauthorized, even after relaying of the first network and second network is stopped.

In the in-vehicle relay device according to another aspect of the present disclosure, a communication unit capable of external communication may be connected to the third network.

According to the above configuration, diagnosis or updating of software by external communication can be performed on the in-vehicle equipment thought to have been unauthorized, even after relaying of the first network and second network is stopped.

In the in-vehicle relay device according to another aspect of the present disclosure, the control unit may resume relaying of the first network and the second network in a case where third data, requesting cancellation of the relay stopping of the first network and second network, is received from the first reception unit or the second reception unit after having received the first data.

According to the above configuration, relaying of the first network and the second network is resumed after appropriate handling of the unauthorized in-vehicle equipment has been performed after reception of the unauthorized activity detection data, and thus can return to the normal state before the unauthorized activity detection data was received.

The in-vehicle relay device according to another aspect of the present disclosure may further include a storage unit that stores the relaying state of the first network and the second network. The control unit may maintain or stop relaying of the first network and the second network at the time if turning the power of the in-vehicle relay device on, based on the relaying state stored in the storage unit.

According to the above configuration, in a case where the power is turned on after the power having been turned off, the relaying state of the first network and second network can be set to the same maintaining of relaying or stopping of relaying as before turning the power off, and unauthorized data can be prevented from being relayed.

The in-vehicle relay device according to another aspect of the present disclosure may further include a first port for connecting the first reception unit and the first transmission unit to the first network, and a second port for connecting the second reception unit and the second transmission unit to the second network. Stopping of the relaying of data of the first network and the second network may be stopping of relaying of the first port and the second port.

According to the above configuration, relaying of data to a port that has transmitted unauthorized activity detection data is stopped at a time of having received unauthorized activity detection data, so transfer of data of unauthorized in-vehicle equipment can be stopped and unauthorized control by unauthorized in-vehicle equipment can be suppressed, and also effects on other in-vehicle equipment can be suppressed.

In the in-vehicle relay device according to another aspect of the present disclosure, stopping of relaying of data of the first network and the second network may stopping of relaying of in-vehicle equipment indicated by a first MAC address connected via the first network, and the second port.

According to the above configuration, when receiving unauthorized activity detection data, relaying of data to in-vehicle equipment indicated by the MAC address that has transmitted unauthorized activity detection data is stopped, thereby stopping transfer of data with the unauthorized in-vehicle equipment, so unauthorized control by the unauthorized in-vehicle equipment can be suppressed, and also effects on other in-vehicle equipment can be suppressed.

In the in-vehicle relay device according to another aspect of the present disclosure, stopping of relaying of data of the first network and the second network may stopping of relaying of in-vehicle equipment indicated by a first IP address connected via the first network, and the second port.

According to the above configuration, when receiving unauthorized activity detection data, relaying of data to in-vehicle equipment indicated by the IP address that has transmitted unauthorized activity detection data is stopped, thereby stopping transfer of data with the unauthorized in-vehicle equipment, so unauthorized control by the unauthorized in-vehicle equipment can be suppressed, and also effects on other in-vehicle equipment can be suppressed.

It should be noted that the above-described general or specific embodiments may be implemented as a system, a device, a method, an integrated circuit, a computer program, or a recording medium such as a computer-readable recording disk or the like, and may be realized by any selective combination of system, device, method, integrated circuit, computer program, and storage medium. The computer-readable storage medium includes non-volatile recording media such as Compact Disc Read-Only Memory (CD-ROM) or the like, for example. A device may also be configured of one or more devices. In a case where a device is configured of two or more devices, the two or more devices may be disposed within one device, or may be disposed divided into two or more devices that have been separated. "Device" as used in the Present Specification and the Claims is not restricted to being able to mean a single device, and can also mean a system made up of multiple devices.

An in-vehicle relay device and the like according to the present disclosure will be described below in detail with reference to the drawings. Note that the embodiments described below are all comprehensive or specific examples of the present disclosure. Accordingly, values, shapes, components, placements and connected states of components, steps (processes), the order of steps, and so forth, illustrated in the following embodiments, are only exemplary, and are not intended to restrict the present disclosure. Components in the following embodiments which are not included in an independent Claim indicating a highest order concept are described as being optional components. Also, the drawings are schematic diagrams, and are not necessarily precise illustrations. Components which are substantially of the same configuration are denoted by the same reference symbols in the drawings, and redundant description may be omitted or simplified.

First Embodiment

The in-vehicle relay device and in-vehicle network will be described as being installed in an automobile having self-driving functions in the following embodiments. The self-driving functions may be at any driving automation level from driving automation level 1 which is driving assistance, to driving automation level 5 which is fully automated driving.

FIG. 1 is a block diagram illustrating an example of the functional configuration of an in-vehicle network 1000 that includes an in-vehicle relay device 100 according to a first embodiment. The in-vehicle network 1000 according to the first embodiment includes the in-vehicle relay devices 100, 120a, 120b, and 120c, an IVI (in-vehicle infotainment) equipment 124, a sensor 126, a camera 128, an ADAS ECU 130, a brakes ECU 132, a steering ECU 134, a communication unit 136, an analysis interface 138, and an unauthorized activity detection device 140, as components, as illustrated in FIG. 1. The in-vehicle network 1000 further includes a CAN 142 and Ethernet (registered trademark) 144, 146, 148, and 150 as networks connecting the above components.

In the following description, the in-vehicle relay device 100 will also be referred to as "first in-vehicle relay device", and the in-vehicle relay devices 120a, 120b, and 120c will also be referred to as "second in-vehicle relay device". In the following embodiment, the second in-vehicle relay devices are in-vehicle relay devices according to the conventional technology, and the first in-vehicle relay device is a new in-vehicle device according to the present disclosure. Note that the first in-vehicle relay device may be applied to the second in-vehicle relay device. Examples of the first in-vehicle relay device 100 and second in-vehicle relay devices 120a, 120b, and 120c include gateways, switches, routers, and devices having these functions built in.

The first in-vehicle relay device 100 according to the first embodiment has five ports, which area port A 102, a port B 104, a port C 106, a port D 108, and a port E 110.

The port A 102 is connected to the second in-vehicle relay device 120c via the Ethernet (registered trademark) 144. The second in-vehicle relay device 120c is connected to the communication unit 136 and analysis interface 138. The communication unit 136 is a telematic communication unit (TCU), which is equipment that connects to an external network such as a cellular phone network or Wireless Fidelity (Wi-Fi) or the like. The analysis interface 138 is an interface for testing or analyzing in-vehicle equipment.

The port B 104 is connected to the unauthorized activity detection device 140, brakes ECU 132, and steering ECU 134, via the CAN 142. The unauthorized activity detection device 140 has functions of detecting unauthorized activity with regard to data received via the CAN 142, and also has functions of invalidating unauthorized data using error frames. The brakes ECU 132 is in-vehicle equipment that performs brake control based on data received via the CAN 142. The steering ECU 134 is in-vehicle equipment that performs steering control based on data received via the CAN 142. Data related to vehicle body control, and data related to vehicle state of the own vehicle, such as speed, acceleration, and so forth.

The port C 106 is connected to the second in-vehicle relay device 120a via the Ethernet (registered trademark) 146. The second in-vehicle relay device 120a is connected to the IVI equipment 124. The IVI equipment 124 has functions such as navigation functions, multimedia playing functions such as music, moving images, and so forth, and the like. The IVI equipment 124 further includes an interface for making function settings regarding the ADAS ECU 130. When self-driving functions are set to on or off with regard to the ADAS ECU 130, the IVI equipment 124 transmits a notification for self-driving functions on or a notification for self-driving functions off to the ADAS ECU 130. In a case where data notifying that unauthorized activity has been detected is received, the IVI equipment 124 can notify the driver of the automobile of the unauthorized activity, and prompt the ADAS ECU 130 to make settings for self-driving functions off.

The port D 108 is connected to the second in-vehicle relay device 120b via the Ethernet (registered trademark) 148. The second in-vehicle relay device 120b is connected to the sensor 126 and camera 128. The sensor 126 and camera 128 are equipment that collect information relating to the environment around the own vehicle, and transmit the collected information from the second in-vehicle relay device 120b to the Ethernet (registered trademark) 148. Examples of the sensor 126 include laser light sensors such as Light Detection and Ranging (LIDAR) and so forth, magnetic sensors, ultrasound sensors, and the like.

The port E 110 is connected to the ADAS ECU 130 via the Ethernet (registered trademark) 150. The ADAS ECU 130 is in-vehicle equipment having the following functions. That is to say, the ADAS ECU 130 recognizes the state around the own vehicle and the state of the own vehicle, based on information obtained from the sensor 126 and camera 128, map information obtained from the IVI equipment 124, and control information obtained from the CAN 142, and decides vehicle control that is to be performed next. The ADAS ECU 130 further transmits vehicle control data to vehicle control ECUs such as the brakes ECU 132, steering ECU 134, and so forth. The ADAS ECU 130 transmits vehicle control data when the self-driving functions are set to on.

The unauthorized activity detection device 140 performs detection of unauthorized activity in data, with regard to data on the CAN 142 in the in-vehicle network 1000. The unauthorized activity detection device 140 performs monitoring of data IDs, data cycles, data values, and so forth, for all data transmitted and received on the CAN 142. In a case of having detected unauthorized activity with regard to the data, the unauthorized activity detection device 140 transmits the ID given to the data that has been determined to be unauthorized to the in-vehicle relay device 100, along with a notification of detection of unauthorized activity.

The unauthorized activity detection device 140 may be configured of a computer system (omitted from illustration) made up of a processor such as a central processing unit (CPU) or a digital signal processor (DSP) or the like, memory such as random access memory (RAM) and read-only memory (ROM) or the like, and so forth. Part or all of the functions of the unauthorized activity detection device 140 may be achieved by the CPU or DSP executing programs recorded in the ROM, using the RAM as workspace memory. Alternatively, part or all of the functions of the unauthorized activity detection device 140 may be achieved by a dedicated hardware circuit, such as an electronic circuit or integrated circuit or the like. Part or all of the functions of the unauthorized activity detection device 140 may be achieved by a combination of the above software functions and hardware circuit.

Figure 2:
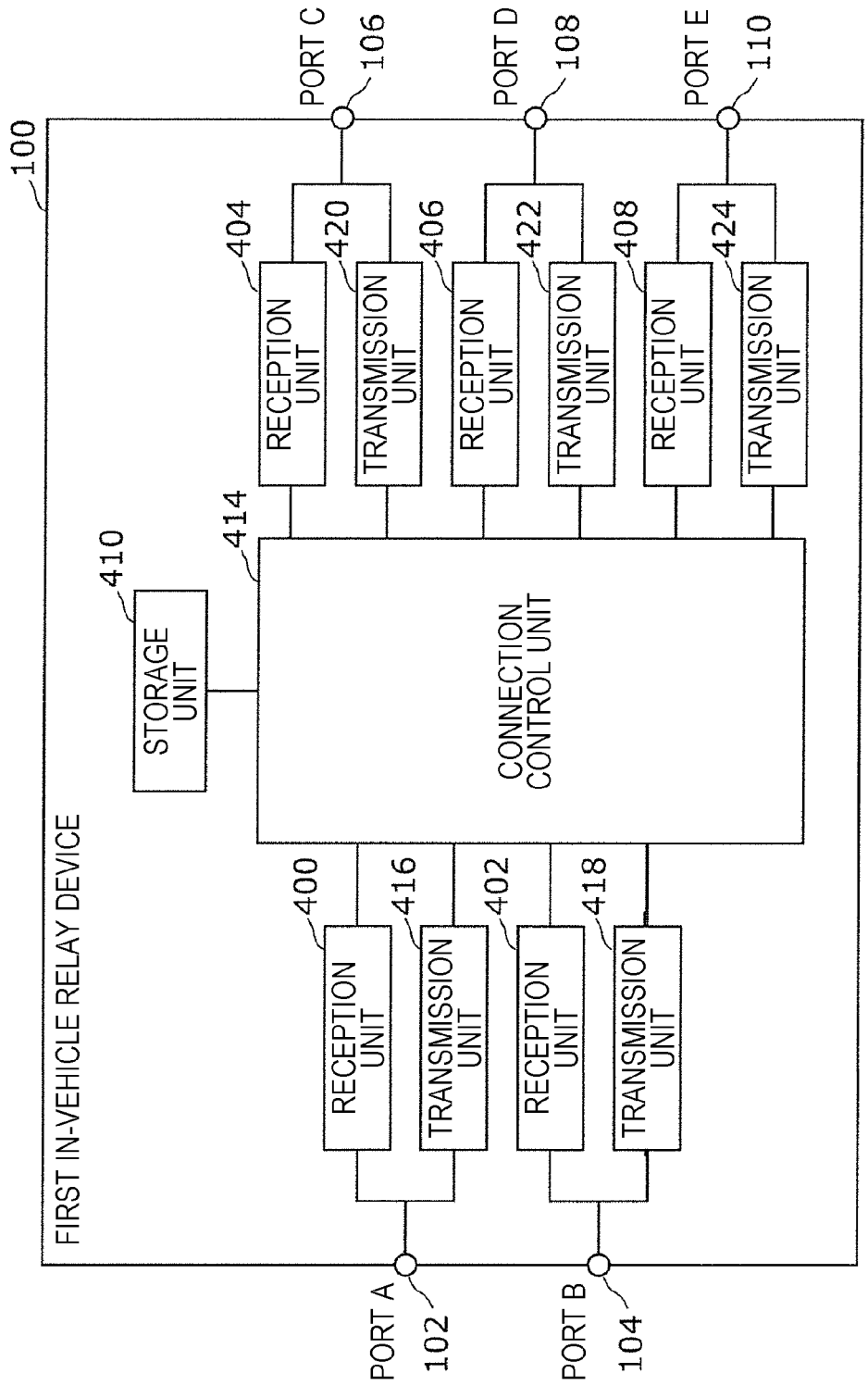
FIG. 2 is a block diagram illustrating an example of the functional configuration of a first in-vehicle relay device according to the first embodiment.

The configuration of the first in-vehicle relay device 100 will be described. FIG. 2 is a block diagram illustrating an example of the functional configuration of the first in-vehicle relay device 100 according to the first embodiment. The first in-vehicle relay device 100 has, in addition to the port A 102, port B 104, port C 106, port D 108, and port E 110, the following components. The first in-vehicle relay device 100 has a reception unit 400 and a transmission unit 416 for the port A 102, a reception unit 402 and a transmission unit 418 for the port B 104, a reception unit 404 and a transmission unit 420 for the port C 106, a reception unit 406 and a transmission unit 422 for the port D 108, and a reception unit 408 and a transmission unit 424 for the port E 110, a storage unit 410, and a connection control unit 414.

The reception units 400, 402, 404, 406, and 408, and the transmission units 416, 418, 420, 422, and 424, are configured of communication circuits, for example. The reception unit 400 and transmission unit 416 of the port A 102, the reception unit 402 and transmission unit 418 of the port B 104, reception unit 404 and transmission unit 420 of the port C 106, the reception unit 406 and transmission unit 422 of the port D 108, and reception unit 408 and transmission unit 424 of the port E 110, are each an example of a communication unit.

The storage unit 410 stores data. The storage unit 410 is realized by, for example, semiconductor memory such as ROM, RAM, flash memory, or the like, or a storage device such as a hard disk drive or solid state drive (SSD) or the like. The storage unit 410 may be configured as a volatile storage device that temporarily stores data, or a non-volatile storage device that can store data even when the power is off.

The connection control unit 414 performs relay control and connection control among the ports, confirmation of recipient of received data, conversion of data formats, reception of unauthorized activity detection data, reception of self-driving functions on/off data, reception of data requesting restriction cancellation of ports, and so forth. The connection control unit 414 may be configured of a computer system (omitted from illustration) made up of a processor such as a CPU or DSP or the like, memory such as RAM and ROM or the like, and so forth. Part or all of the functions of the connection control unit 414 may be achieved by the CPU or DSP executing programs recorded in the ROM, using the RAM as workspace memory. Alternatively, part or all of the functions of the connection control unit 414 may be achieved by a dedicated hardware circuit, such as an electronic circuit or integrated circuit or the like. Part or all of the functions of the connection control unit 414 may be configured of a combination of the above software functions and hardware circuit. The connection control unit 414 is an example of a control unit.

Next, the operations of the first in-vehicle relay device 100 according to the first embodiment will be described with reference to FIG. 3. Note that FIG. 3 is a flowchart illustrating an example of processing by the first in-vehicle relay device 100 according to the first embodiment.

First, in step S500, the first in-vehicle relay device 100 receives data from one of the reception unit 400 of the port A 102, the reception unit 402 of the port B 104, the reception unit 404 of the port C 106, the reception unit 406 of the port D 108, or the reception unit 408 of the port E 110.

Next, in step S502, the connection control unit 414 determines whether or not the received data is addressed to itself, i.e., data addressed to the first in-vehicle relay device 100, from a MAC (Media Access Control) address or CAN IF of the reception data that is data that has been received. If not data addressed to itself (No in step S502), the connection control unit 414 performs the processing of step S504. If data addressed to itself (Yes in step S502), the connection control unit 414 performs the processing of step S506.

In step S504, the connection control unit 414 performs later-described normal transfer processing, which is transfer processing that is normally performed.

In step S506, the connection control unit 414 determines whether or not the reception data is unauthorized activity detection data, to make notification that unauthorized activity has been detected. Unauthorized activity detection data is provided with a notification of detection of unauthorized activity, and an ID given to the data that has been determined to be unauthorized. In a case where the reception data is unauthorized activity detection data (Yes in step S506), the connection control unit 414 performs the processing of step S508. In a case where the reception data is not unauthorized activity detection data (No in step S506), the connection control unit 414 performs the processing of step S510.

Note that unauthorized activity detection data may be transmitted to the first in-vehicle relay device 100 by in-vehicle devices, the second in-vehicle relay devices 120a through 120c, or the unauthorized activity detection device 140, connected to the port A 102 through port E 110. For example, the second in-vehicle relay devices 120a through 120c may have unauthorized activity detection functions to detect unauthorized activity in data, and be configured to transmit unauthorized activity detection data. The in-vehicle equipment such as the IVI equipment 124 or the like, connected to Ethernet (registered trademark) 144, 146, 148, or 150, or the CAN 142, may have unauthorized activity detection functions to detect unauthorized activity in data, and be configured to transmit unauthorized activity detection data.

In step S508, the connection control unit 414 performs later-described port connection changing processing, for changing the connection relation among ports.

In step S510, the connection control unit 414 determines whether or not reception data is restriction cancellation request data for requesting cancellation of restriction on connection/blocking as to a predetermined port. In a case where the reception data is restriction cancellation request data (Yes in S510), the connection control unit 414 performs the processing of step S512. In a case where the reception data is not restriction cancellation request data (No in S510), the connection control unit 414 performs the processing of step S514.

In step S512, the connection control unit 414 cancels restriction of connection/blocking as to another port with regard to the port instructed in the restriction cancellation request data. The connection control unit 414 updates a later-described reception port storage table stored in the storage unit 410.

In step S514, the connection control unit 414 determines whether or not the reception data is self-driving functions off data indicating that the self-driving functions are in an off state. That is to say, the connection control unit 414 determines whether or not the self-driving functions are in an off state. The self-driving functions off data may include data to turn the self-driving functions off, such as a command to turn the self-driving functions off, or the like. In a case where the reception data is self-driving functions off data (Yes in step S514), the connection control unit 414 performs the processing of step S516. In a case where the reception data is not self-driving functions off data (No in step S514), the connection control unit 414 performs the processing of step S518.

In step S516, the connection control unit 414 notifies within the connection control unit 414 that the self-driving functions are in an off state.

In step S518, the reception data is a normal control packet, so the connection control unit 414 performs processing in accordance with the control contents of the reception data.

Next, details of port connection changing processing in step S508 will be described with reference to FIG. 4. FIG. 4 is a flowchart illustrating an example of port connection changing processing of the first in-vehicle relay device 100 according to the first embodiment.

First, in step S2102, the connection control unit 414 starts an unshown change standby timer of the first in-vehicle relay device 100, and starts timing.

Next, in step S2104, the connection control unit 414 identifies a port that has received unauthorized data that has been detected, from the ID included in the unauthorized activity detection data. Specifically, the connection control unit 414 identifies the port that has received unauthorized data that has been detected, using the reception port storage table stored in the storage unit 410. The reception port storage table correlates the ID of the data, reception port, and transmission port. The reception port is the port by which this data is received by the first in-vehicle relay device 100. The transmission port is a port by which this data that has been received is transmitted from the first in-vehicle relay device 100. The reception port storage table indicates the flow of data of various types of IDs from reception port to transmission port. The reception port storage table is recorded by the connection control unit 414.

Now, FIG. 5 illustrates an example of the reception port storage table stored in the storage unit 410 of the first in-vehicle relay device 100 according to the first embodiment. The reception port storage table 600 is a table that lists sets of ID included in reception data, the port that has received the reception data (reception port), and the port that transmits the reception data (transmission port), as illustrated in FIG. 5. For example, in a case where the ID included in the unauthorized activity detection data is "0x1A", the reception port where the ID is "0x1A" can be identified as being "port E" in the reception port storage table 600. That is to say, the reception port of the unauthorized data that has been detected can be identified as being port E 110.

Returning to FIG. 4, after having identified the port that has received the detected unauthorized data, the connection control unit 414 blocks connection of this port to other ports. That is to say, connection between the reception unit and transmission unit of this port with the reception units and transmission units of other ports is blocked. This processing for blocking connection is the processing in the following steps S2106, S2108, and S2110. The connection control unit 414 carries out blocking of connection at the timing of a predetermined amount of time having elapsed, or the timing of having received self-driving functions off data, which will be described later.

In step S2106, the connection control unit 414 determines whether the timer value, which is the time that has been timed by the change standby timer, is greater than a predetermined value (timer value>predetermined value) or not. In a case where the timer value is found to be greater than the predetermined value as the result of the determination (Yes in step S2106), the connection control unit 414 performs the processing of step S2110. In a case where the timer value is found to be not greater than the predetermined value as the result of the determination (No in step S2106), the connection control unit 414 performs the processing of step S2108.

In step S2108, the connection control unit 414 determines whether self-driving functions off data has been received or not. In a case where self-driving functions off data is found to have been received as a result of the determination (Yes in step S2108), the connection control unit 414 performs the processing in step S2110. In a case where self-driving functions off data is found to have not been received as a result of the determination (No in step S2108), the connection control unit 414 returns to the processing in step S2106. Note that the timing of self-driving functions being turned off may be after reception of unauthorized activity detection data being received, or prior to being received.

In step S2110, the connection control unit 414 blocks connection between the port that has received the detected unauthorized data and other ports. For example, in a case where the port that has received the unauthorized data that has been detected is "port E", the connection control unit 414 blocks connection of the port E with ports A, B, C, and D.

Figures 6A, 6B, 7:
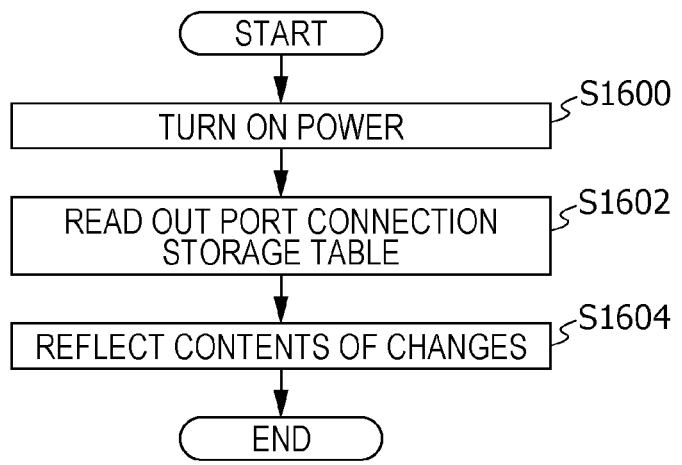
FIGS. 6A and 6B are diagrams illustrating an example of a port connection storage table stored in the storage unit of the first in-vehicle relay device according to the first embodiment.
FIG. 7 is a flowchart illustrating an example of connection relation reflecting processing among ports at the time of turning the power of the first in-vehicle relay device according to the first embodiment.

Now, FIG. 6A illustrates an example of a port connection storage table stored in the storage unit 410 of the first in-vehicle relay device 100 according to the first embodiment. FIG. 6A illustrates an example of the port connection storage table after the processing in step S2110. The port connection storage table 2300 is a table that shows connection permissibility among ports, as illustrated in FIG. 6A. In other words, the port connection storage table 2300 shows connection relations among ports. The connection control unit 414 connects between ports following the port connection storage table. The column direction in the port connection storage table 2300 represents reception ports of the first in-vehicle relay device 100, and the row direction represents ports of the first in-vehicle relay device 100 that are transmission destinations of the reception ports. Intersections between reception ports and transmission destination ports that are in a connectable state are indicated by "•", and those that are not in a connectable state are indicated by "-".

Upon blocking connections between ports as described above, the connection control unit 414 updates the port connection storage table 2300 stored in the storage unit 410. For example, in a case of blocking connection of the port E with ports A, B, C, and D, the connection control unit 414 updates the port connection storage table 2300 by changing the "•" indicating that the port E is connectable with ports A, B, C, and D, to "-" indicating not connectable. The portion of the port connection storage table 2300 that is thus updated is the portion in FIG. 6A surrounded by dashed lines.

Returning to FIG. 4, in step S2112, the connection control unit 414 stops the change standby timer, and clears the timer value of the change standby timer to "0", for example.

Next, in step S2114, the connection control unit 414 confirms whether or not there are any settings for connection of a particular port. A particular port is a port provided in order to perform analysis of a component such as an unauthorized ECU or the like, and so forth. In the present embodiment, the port A to which the analysis interface 138 is connected is the particular port. In a case where there are connection settings of the particular port, i.e., in a case where connection to the particular port have has been set (Yes in S2114), the connection control unit 414 performs the processing of step S2116. In a case where there are no connection settings of the particular port, i.e., in a case where connection to the particular port have has not been set (No in S2114), the connection control unit 414 ends the processing.

Information indicating connection settings of the particular port here is information of presence/absence of the particular port for connection, and information specifying the particular port for connection, such as port No. or the like, and so forth. Such information is set beforehand, and may be written to the storage unit 410 or the like at the time of factory shipping of the first in-vehicle relay device 100 or a device or system including the first in-vehicle relay device 100, or at the time of installation in an automobile.

In step S2116, the connection control unit 414 connects the port that that has received the detected unauthorized data with the particular port, and updates the port connection storage table 2300. In the present embodiment, the connection control unit 414 connects the port E and port A.

Now, FIG. 6B illustrates another example of a port connection storage table stored in the storage unit 410 of the first in-vehicle relay device 100 according to the first embodiment. FIG. 6B illustrates an example of the port connection storage table after the processing in step S2116. The portion of the port connection storage table 2300 that is updated from the state in FIG. 6A is surrounded by dashed lines, as illustrated in FIG. 6B.

By performing the above connection, the connection control unit 414 restricts the relay destination of data received from the port E to the communication unit 136 and analysis interface 138. Diagnosis of the in-vehicle equipment that is the transmission source of data is performed by diagnostics equipment such as a diagnostics device or diagnostics server or the like that is omitted from illustration, that is outside of the in-vehicle network 1000, via the communication unit 136 or analysis interface 138, and firmware is updated as necessary. Thus, the detected unauthorized state is corrected, and the in-vehicle equipment can be returned to a normal state. After having returned the in-vehicle equipment to a normal state, the diagnostics equipment sends restriction cancellation request data to the connection control unit 414 via the communication unit 136. Although the restriction cancellation request data has been described as being sent via the communication unit 136, this is not restrictive. The restriction cancellation request data may be sent by other routes or arrangements.

Now, when the power of the first in-vehicle relay device 100 according to the present embodiment is turned off after changing connections among ports as described above, and the power is turned on again, the connection relation among the ports before turning off the power is reflected. Processing for reflecting the connection relation among the ports before turning off the power of the first in-vehicle relay device 100 when turning on the power again will be described with reference to FIG. 7. FIG. 7 is a flowchart illustrating an example of connection relation reflecting processing among ports at the time of turning on the power of the first in-vehicle relay device 100 according to the first embodiment.

First, the power of the first in-vehicle relay device 100 is turned on in step S1600. Next, in step S1602, the connection control unit 414 reads out the port connection storage table 2300 from the storage unit 410. Note that the port connection storage table 2300 is stored in a non-volatile region that the storage unit 410 has. Then in step S1604, the connection control unit 414 changes connections among ports based on the port connection storage table 2300 that has been read out, i.e., sets the connections among the ports.

According to the above, the connection relation among ports of the first in-vehicle relay device 100 can be returned to the same relation before having turned off the power, even after the power has been turned off and then turned on again. Accordingly, even if the power of the first in-vehicle relay device 100 has been turned off due to the engine stopping or the like after the connection relation among ports having been changed due to detection of unauthorized activity, reversion to the initial state does not occur, and unauthorized data can be prevented from being relayed via the first in-vehicle relay device 100.

Next, details of normal transfer processing in step S504 in FIG. 3 will be described with reference to FIG. 8. FIG. 8 is a flowchart illustrating an example of normal transfer processing by the first in-vehicle relay device 100 according to the first embodiment.

First, the connection control unit 414 determines whether the port that has received data is connected to the CAN or Ethernet (registered trademark) in step S2000. In a case where the port is connected to the CAN (Yes in step S2000), the connection control unit 414 performs the processing of step S2002. In a case where the port is connected to the Ethernet (registered trademark) (No in step S2000), the connection control unit 414 performs the processing of step S2006.

In step S2002, the connection control unit 414 converts the received data into a data format following the Ethernet (registered trademark) protocol, since the reception data is of a data format following the CAN protocol. In order to do this, the ID included in the reception data has to be converted into a MAC address. The connection control unit 414 uses an ID-MAC conversion table in order to convert the ID included in the reception data into a MAC address. The ID-MAC conversion table records IDs of reception data via the CAN, and MAC addresses of destinations corresponding to the IDs, in a correlated manner. The connection control unit 414 confirms the MAC address of the destination corresponding to the ID of the reception data, i.e., confirms the destination MAC address, using the ID-MAC conversion table.

FIG. 9 here illustrates an example of a ID-MAC conversion table stored in the storage unit 410 of the first in-vehicle relay device 100 according to the first embodiment. As illustrated in FIG. 9, the ID-MAC conversion table 700 is a table listing sets of IDs included in reception data and destination MAC addresses corresponding to the IDs. For example, in a case where the ID included in reception data is "02", the corresponding destination MAC address is "MAC address B". Note that the ID-MAC conversion table is stored in a non-volatile region that the storage unit 410 has in the present embodiment, but may be stored in a volatile region that the storage unit 410 has.

Returning to FIG. 8, the connection control unit 414 in step S2004 uses the destination MAC address confirmed in the ID-MAC conversion table 700 to convert the reception data into a format following the Ethernet (registered trademark) protocol.

In step S2006, the connection control unit 414 uses the destination MAC address included in the header of the reception data to decide the transmission port, which is the transmission destination port. At the stage of step S2006, the reception data is in the format following the Ethernet (registered trademark) protocol, regardless of whether the receiving port is connected to the CAN or Ethernet (registered trademark). The connection control unit 414 uses the destination MAC address included in the header of the reception data to reference a MAC address conversion table stored in the storage unit 410, thereby deciding the transmission port to transmit the reception data to. The MAC address conversion table records destination MAC addresses of reception data and transmission ports corresponding to the destination MAC addresses, in a correlated manner.

Figure 10:
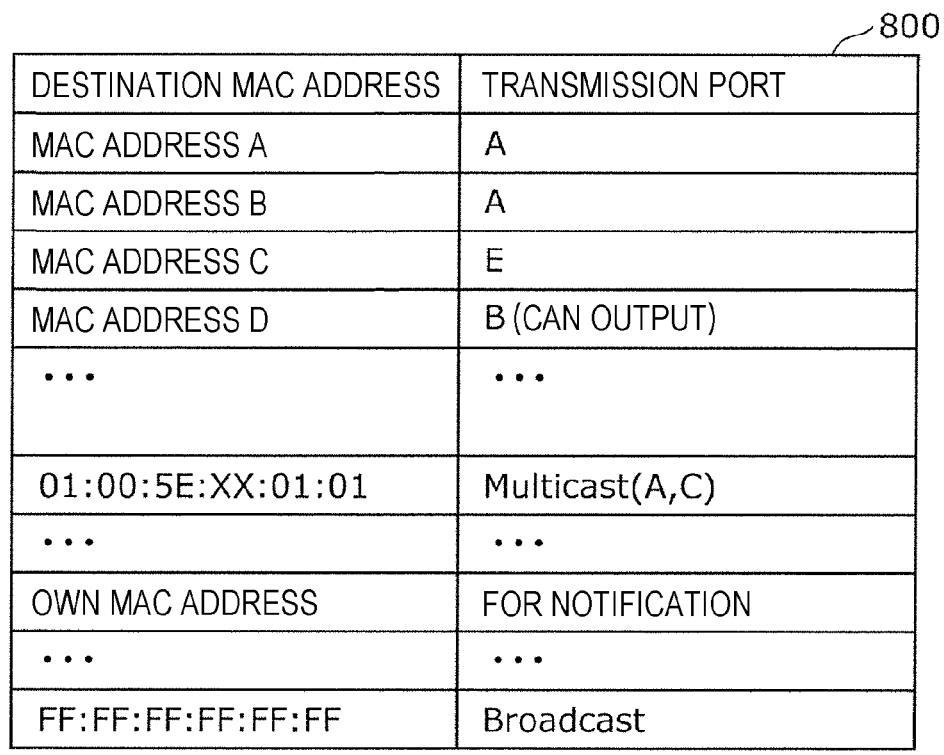
FIG. 10 is a diagram illustrating an example of a MAC address conversion table stored in the storage unit of the first in-vehicle relay device according to the first embodiment.

FIG. 10 is a diagram illustrating an example of a MAC address conversion table stored in the storage unit 410 of the first in-vehicle relay device 100 according to the first embodiment. As illustrated in FIG. 10, the MAC address conversion table 800 is a table showing transmission ports corresponding to destination MAC addresses included in headers of reception data. For example, in a case where the destination MAC address included in the header of reception data is "MAC address B", the corresponding transmission port is port "A" in the MAC address conversion table 800.

The connection control unit 414 in step S2008 then determines whether the port of the reception data and the transmission port decided in step S2006 are in a state that is connectable, i.e., in a connected state. The connection control unit 414 uses the port connection storage table to determine the connection state. If a connected state (Yes in S2008), the connection control unit 414 performs the processing of step S2010. If not a connected state (No in S2008), the connection control unit 414 ends the processing.

In step S2010, the connection control unit 414 updates the reception port storage table 600 such as illustrated in FIG. 5, stored in the storage unit 410. Note that in a case the capacity of the storage unit 410 is limited, the connection control unit 414 may store in the storage unit 410 with priority on new content of the reception port storage table 600. Alternatively, the connection control unit 414 may restrict the number of sets of "transmission port—ID—reception port" that are stored.

Then in step S2012, the connection control unit 414 determines whether the transmission port where the reception data is to be transmitted is connected to the CAN or connected to the Ethernet (registered trademark). In a case where the transmission port is connected to the CAN (Yes in step S2012), the connection control unit 414 performs the processing of step S2014. In a case where the transmission port is connected to the Ethernet (registered trademark) (No in step S2012), the connection control unit 414 performs the processing of step S2016. In step S2014, the connection control unit 414 converts the reception data into a data format following the CAN protocol. The connection control unit 414 preforms conversion using the ID-MAC conversion table.

In step S2016, the connection control unit 414 transmits the reception data from the transmission port decided in step S2006.

Note that the configuration of the in-vehicle network 1000 according to the first embodiment that is illustrated in FIG. 1 is but an example, and is not restricted to this, as long as a configuration that includes the first in-vehicle relay device 100 and a configuration of detecting unauthorized activity such as the unauthorized activity detection device 140 or the like. For example, although the number of ports connected to the CAN out of the multiple ports of the first in-vehicle relay device 100 is only one in the first embodiment, a configuration may be made where multiple ports are connected to the CAN. Alternatively, an arrangement may be made where all networks, including the network to which the control ECUs such as brake ECUs and so forth are connected, are configured of Ethernet (registered trademark) networks. In this case, a configuration may be made where unauthorized activity detection data lists a transmission source MAC address regarding which connection change should be made, and the first in-vehicle relay device performs connection changing among the ports based on the MAC address thereof.

Also, although in-vehicle equipment, networks, equipment, and out-of-vehicle equipment are included as components in the in-vehicle network 1000 according to the first embodiment, components are not restricted to these. The in-vehicle network 1000 may be configured including other in-vehicle equipment, networks, equipment, and out-of-vehicle equipment. The in-vehicle network 1000 also has been described as a configuration having the ADAS ECU 130, but may have an ECU capable of handling more sophisticated self-driving functions instead of ADAS functions.

The first in-vehicle relay device 100 may also perform changing of connections among ports using a VLAN (Virtual Local Area Network).

The unauthorized activity detection data is not limited to being transmitted with the first in-vehicle relay device 100 as the destination, and may be transmitted with another ECU or the like as the destination, may be transmitted by multicast, and may be transmitted by broadcast. In a case of transmission by multicast or broadcast, the first in-vehicle relay device 100 transmits the unauthorized activity detection data that has been received to other ECUs and so forth.

Although the self-driving functions off data has been described as being sent by the IVI equipment 124 in the first embodiment, sending thereof may be made by other ECUs, meter equipment, or interface equipment.

Upon receiving unauthorized activity detection data, the first in-vehicle relay device 100 according to the first embodiment described above can stop transfer of data from the port that has received the unauthorized data to other ports by changing the connection of ports in accordance with unauthorized activity detection data, and thereby suppress the attack from spreading. At the same time, the first in-vehicle relay device 100 connects the port that has received the unauthorized data to a port connected to an external connection interface for a data communication unit or the like or a port connected to an external connection interface for diagnostics equipment or the like, thereby enabling firmware updating or diagnostics analysis from external equipment. For example, a CAN is a bus-based network, and signals output from equipment to the CAN is received by all equipment connected to the CAN. Accordingly, in a case where a CAN and Ethernet (registered trademark) are connected coexisting at multiple ports in the first in-vehicle relay device 100 according to the first embodiment, stopping transfer of data from a port that has received unauthorized data to other ports is effective in preventing spread of attacks.

The first in-vehicle relay device 100 waits a predetermined amount of time after having received the unauthorized activity detection data, or waits for some time until the operator of the vehicle regarding which the unauthorized activity detection has been notified turns off the self-driving function that is being affected by the unauthorized activity or is the cause of the unauthorized activity, and blocks connection to the port that has received the unauthorized data. For example, in a case where the ECU connected to the port that has received the unauthorized data is an ECU relating to self-driving functions, suddenly stopping relay of data from this ECU may put the automobile in an uncontrolled state. The first in-vehicle relay device 100 can prevent such uncontrolled states from occurring, and reduce delay of blocking connection to the above-described port.

Also, the reception port storage table according to the first embodiment stores sets of IDs, reception ports, and transmission ports, and thereby can store multiple information regarding the same transmission port. Also, even in a case where other data has been relayed by the first in-vehicle relay device 100 after having received the unauthorized data but before receiving the unauthorized activity detection data, the port that has received the unauthorized data can be identified by referencing the reception port storage table. Accordingly, in a case where detection of unauthorized activity requires time, and reception of unauthorized activity detection data requires time as well, the first in-vehicle relay device 100 can still handle the situation retrospectively.

Figure 11:
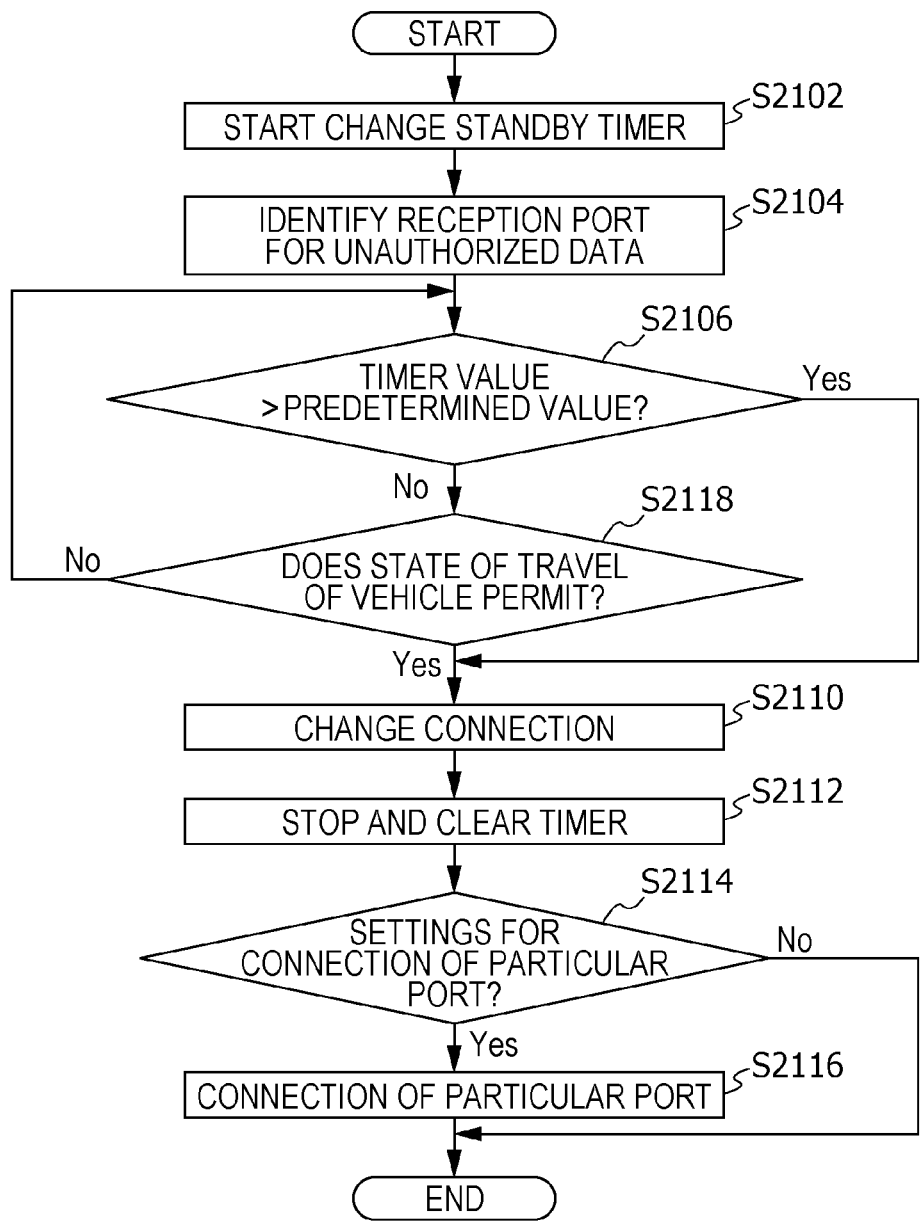
FIG. 11 is a flowchart illustrating a modification of port connection changing processing by the first in-vehicle relay device according to the first embodiment.

The first in-vehicle relay device 100 according to the first embodiment may also take into consideration the state of traveling of the vehicle in which the first in-vehicle relay device 100 is installed in the port connection changing processing in step S508. For example, the connection control unit 414 may perform determining processing of step S2118 in FIG. 11, instead of step S2108. FIG. 11 is a flowchart illustrating a modification of the port connection changing processing by the first in-vehicle relay device 100 according to the first embodiment. In step S2118, the connection control unit 414 determines whether the traveling state of the vehicle is a state where connections can be blocked, i.e., whether or not the vehicle is in a traveling state, before blocking connections of the port that has received the detected unauthorized data with other ports. In a case where the state is that connections can be blocked (Yes in step S2118), the connection control unit 414 performs the processing of step S2110. In a case where the state is that connections cannot be blocked (No in step S2118), the connection control unit 414 returns to the processing of step S2106.

Examples of requisites for the traveling state of the vehicle to be in a state where connections can be blocked include that the vehicle is stopped, the vehicle speed is a low speed at or below a predetermined speed, the brakes are being applied, the hazard indicator is on, the driver is in a state capable of driving, the vehicle is at a predetermined location such as a pull-off area, and so forth. Requisites for the traveling state of the vehicle to be in a state where connections can be blocked may include that the self-driving functions are in an off state. The connection control unit 414 may determine that the traveling state of the vehicle is in a state where connections can be blocked in a case where at least one of the above requisites is satisfied. The connection control unit 414 may determine whether or not one of the above states from detection information from detection devices such as a vehicle speed sensor, sensor 126, camera 128, and so forth, and output information from ECUs such as the brakes ECU 132, navigation information of the IVI equipment 124, steering ECU 134, ADAS ECU 130, and so forth.

For example, that the vehicle is stopped can be judged from vehicle speed, or detection information of the sensor 126. That the brakes are being applied can be judged from output information of the brakes ECU 132. The hazard indicator being on can be judged from output information from an ECU controlling lighting. The state of the driver can be judged from images of a camera shooting inside of the cabin or output information from an ECU controlling devices of a vehicle operating system. The location of the vehicle can be judged from navigation information from the IVI equipment 124.

The first in-vehicle relay device 100 blocks communication between a port that has received detected unauthorized data and other ports, in accordance with the traveling state of the vehicle. Accordingly, a situation where traveling of the vehicle becomes unstable due to blocking connection can be suppressed.

Second Embodiment

An in-vehicle relay device according to a second embodiment will be described. A first in-vehicle relay device 900 that is an in-vehicle device according to the second embodiment differs from the first embodiment with regard to the point that Ethernet (registered trademark) is connected to all ports. The second embodiment will be described below, primarily with regard to points that differ from the first embodiment.

Figure 12:
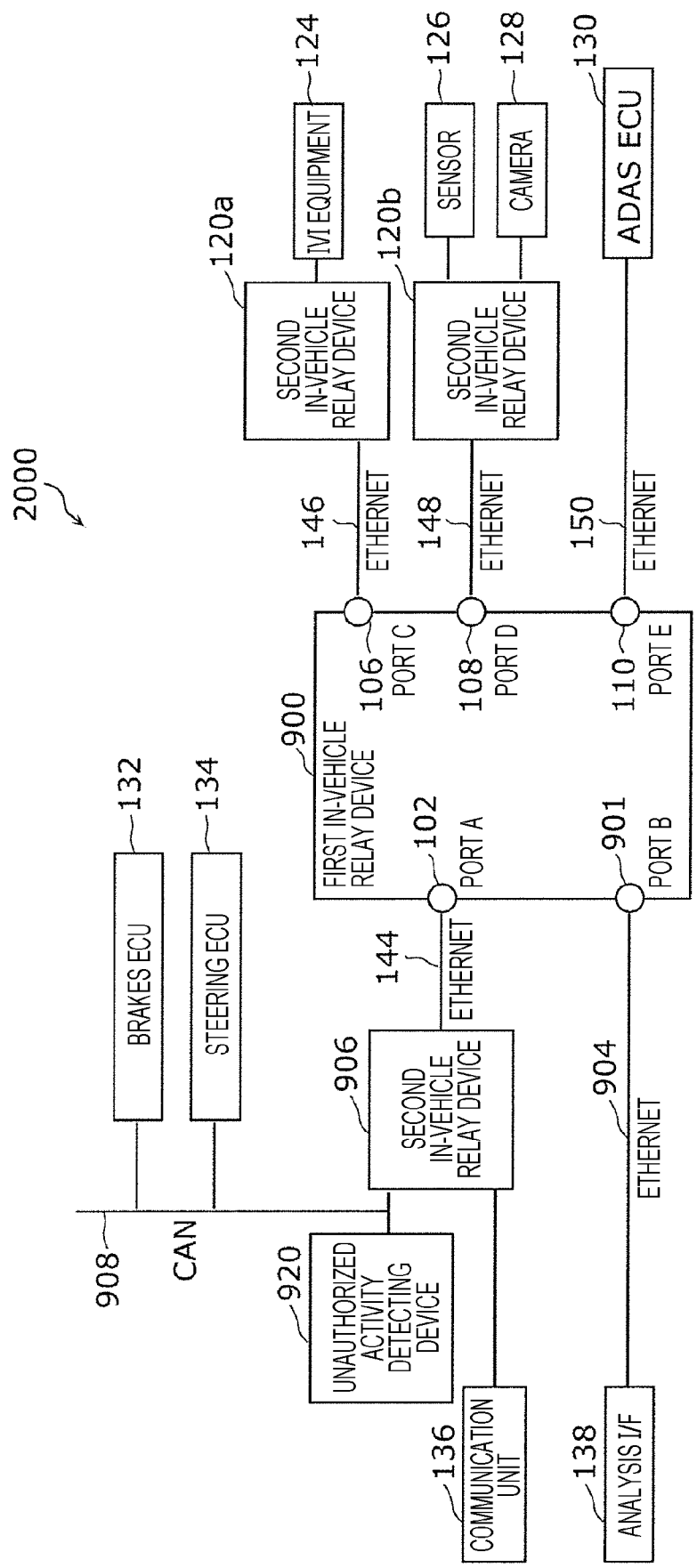
FIG. 12 is a block diagram illustrating an example of the functional configuration of an in-vehicle network that has the first in-vehicle relay device according to a second embodiment.

FIG. 12 is a block diagram illustrating an example of the functional configuration of an in-vehicle network 2000 that has the first in-vehicle relay device 900 according to the second embodiment. As illustrated in FIG. 12, the in-vehicle network 2000 has the first in-vehicle relay device 900, second in-vehicle relay devices 120*a*, 120*b*, and 906, the IVI equipment 124, sensor 126, camera 128, ADAS ECU 130, brakes ECU 132, steering ECU 134, communication unit 136, analysis interface 138, and an unauthorized activity detection device 920, as components. The in-vehicle network 2000 further includes, as networks connecting the above components, a CAN 908, and Ethernet (registered trademark) cables 144, 146, 148, 150, and 904.

The first in-vehicle relay device 900 according to the second embodiment has five ports, which are the port A 102, a port B 901, the port C 106, the port D 108, and the port E 110.

The port A 102 is connected to the second in-vehicle relay device 906 via the Ethernet (registered trademark) cable 144. The second in-vehicle relay device 906 is connected to the communication unit 136. The second in-vehicle relay device 906 is further connected to the unauthorized activity detection device 920, brakes ECU 132, and steering ECU 134, via the CAN 908. The port B 901 is connected to the analysis interface 138 via the Ethernet (registered trademark) cable 904. The objects of connection of the port C 106, port D 108, and port E 110 are the same as in the first embodiment.

In a case of having detected unauthorized activity with regard to data received via the CAN 908, the unauthorized activity detection device 920 notifies the second in-vehicle relay device 906 of unauthorized activity detection data including the ID given to the data that has been determined to be unauthorized, via the CAN 908, and further transmits the unauthorized activity detection data to the first in-vehicle relay device 900 via the Ethernet (registered trademark) cable 144. Note that the unauthorized activity detection device 920 may have functions of invalidating unauthorized data using error frames, in addition to the unauthorized activity detection functions.

Figure 13:
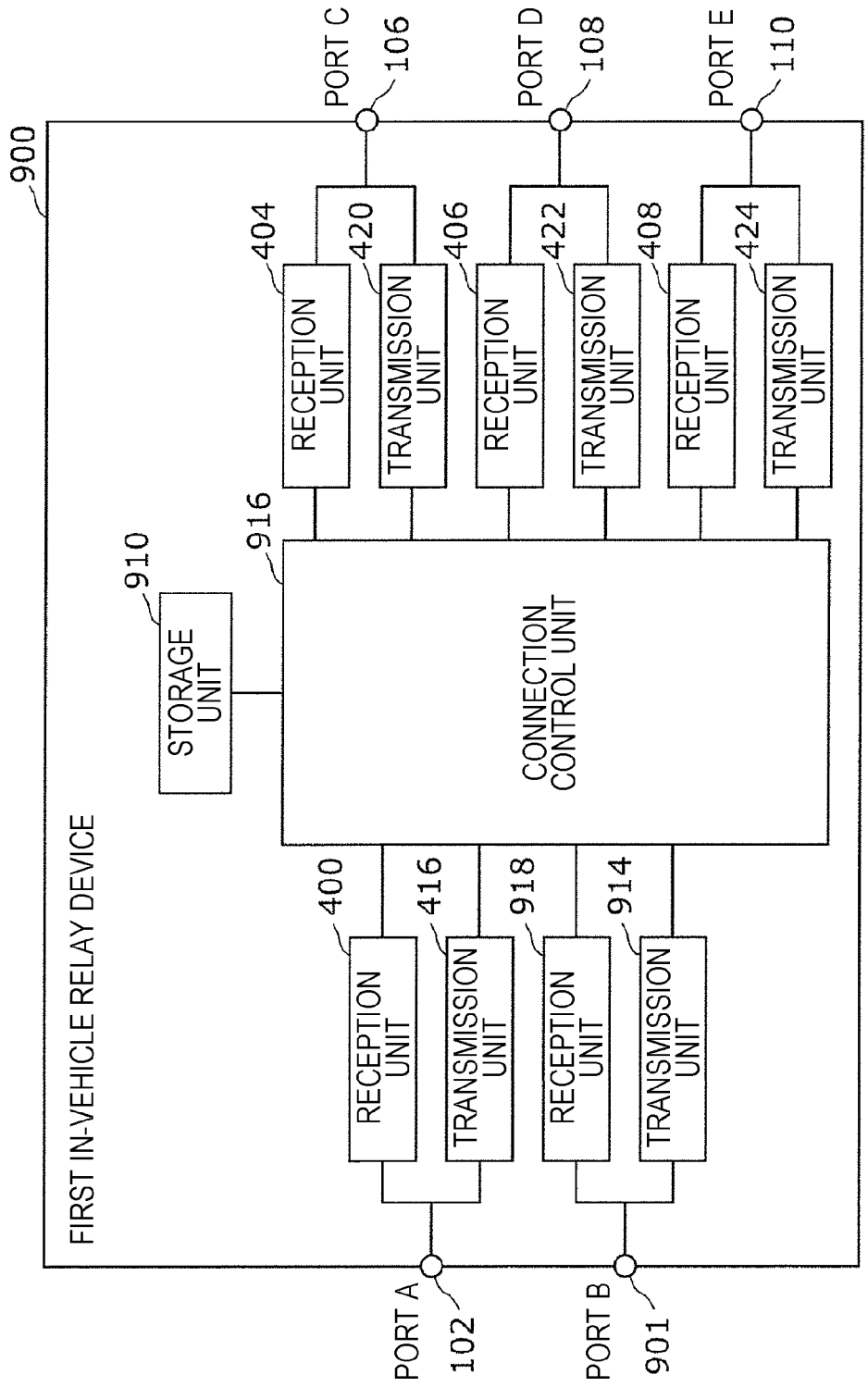
FIG. 13 is a block diagram illustrating an example of the functional configuration of a first in-vehicle relay device according to the second embodiment.

The configuration of the first in-vehicle relay device 900 will be described. FIG. 13 is a block diagram illustrating an example of the functional configuration of the first in-vehicle relay device 900 according to the second embodiment. The first in-vehicle relay device 900 has the reception unit 400 and transmission unit 416 for the port A 102, a reception unit 918 and a transmission unit 914 for the port B 901, the reception unit 404 and transmission unit 420 for the port C 106, the reception unit 406 and transmission unit 422 for the port D 108, and the reception unit 408 and transmission unit 424 for the port E 110, a storage unit 910, and a connection control unit 916, as illustrated in FIG. 13.

The reception units 400, 918, 404, 406, and 408, and the transmission units 416, 914, 420, 422, and 424, have the same configuration as in the first embodiment. The storage unit 910 has the same configuration as the storage unit 410 in the first embodiment. The connection control unit 916 performs relay control and connection control among the ports, confirmation of destinations of received data, format conversion of data, reception of unauthorized activity detection data, reception of self-driving functions on/off data, reception of restriction cancellation request data, and so forth.

Figure 14:
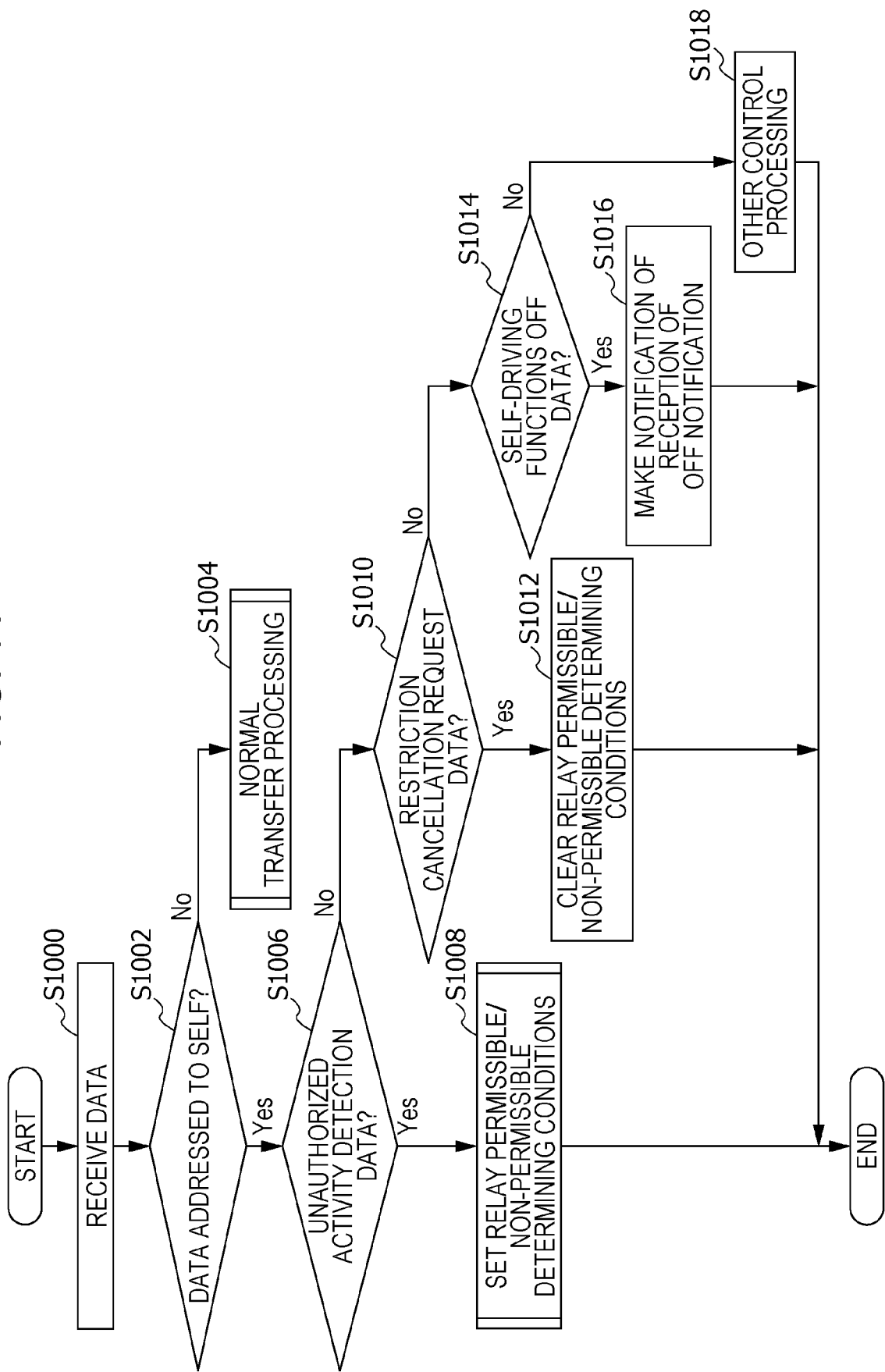
FIG. 14 is a flowchart illustrating an example of processing by the first in-vehicle relay device according to the second embodiment.

Next, the operations of the first in-vehicle relay device 900 according to the second embodiment will be described with reference to FIG. 14. Note that FIG. 14 is a flowchart illustrating an example of processing by the first in-vehicle relay device 900 according to the second embodiment.

First, in step S1000, the first in-vehicle relay device 900 receives data from one of the reception unit 400 of the port A 102, the reception unit 918 of the port B 901, the reception unit 404 of the port C 106, the reception unit 406 of the port D 108, or the reception unit 408 of the port E 110.

Next, in step S1002, the connection control unit 916 determines whether or not the received data is addressed to itself, i.e., data addressed to the first in-vehicle relay device 900, from the destination MAC address of the reception data. If not data addressed to itself (No in step S1002), the connection control unit 916 performs the processing of step S1004. If data addressed to itself (Yes in step S1002), the connection control unit 916 performs the processing of step S1006.

In step S1004, the connection control unit 916 performs the later-described normal transfer processing.

In step S1006, the connection control unit 916 determines whether or not the reception data is unauthorized activity detection data. In a case where the reception data is unauthorized activity detection data (Yes in step S1006), the connection control unit 916 performs the processing of step S1008. In a case where the reception data is not unauthorized activity detection data (No in step S1006), the connection control unit 916 performs the processing of step S1010.

In step S1008, the connection control unit 916 performs later-described relay permissible/non-permissible determining conditions setting processing for setting conditions to perform determination if whether or not relaying of data to the MAC address is permissible.

In step S1010, the connection control unit 916 determines whether or not reception data is restriction cancellation request data for requesting cancellation of restriction on relay blocking as to a predetermined MAC address. In a case where the reception data is restriction cancellation request data (Yes in step S1010), the connection control unit 916 performs the processing of step S1012. In a case where the reception data is not restriction cancellation request data (No in step S1010), the connection control unit 916 performs the processing of step S1014.

In step S1012, the connection control unit 916 clears the relay permissible/non-permissible determining conditions for determining whether or not relaying of data to the MAC address is permissible with regard to the MAC address specified in the restriction cancellation request data.

In step S1014, the connection control unit 916 determines whether or not the reception data is self-driving functions off data. In a case where the reception data is self-driving functions off data (Yes in step S1014), the connection control unit 916 performs the processing of step S1016. In a case where the reception data is not self-driving functions off data (No in step S1014), the connection control unit 916 performs the processing of step S1018.

In step S1016, the connection control unit 916 notifies within the connection control unit 916 that the self-driving functions are in an off state.

In step S1018, the reception data is a normal control packet, so the connection control unit 916 performs processing in accordance with the control contents of the reception data.

Figures 15, 16:
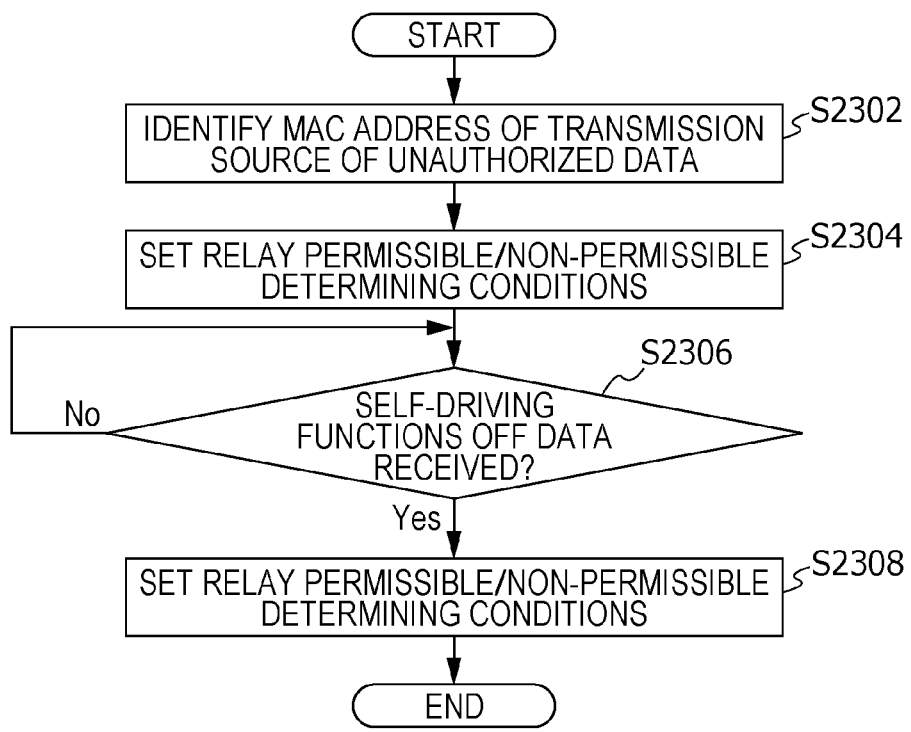
FIG. 15 is a flowchart illustrating an example of a relay permissibility determination processing by the first in-vehicle relay device according to the second embodiment.
FIG. 16 is a diagram illustrating an example of a reception MAC address storage table stored in a storage unit of the first in-vehicle relay device according to the second embodiment.

Next, details of port relay permissible/non-permissible determining conditions setting processing in step S1008 will be described with reference to FIG. 15. FIG. 15 is a flowchart illustrating an example of permissible/non-permissible determining conditions setting processing of the first in-vehicle relay device 900 according to the second embodiment.

First, in step S2302, the connection control unit 916 identifies the MAC address of the transmission source of the unauthorized data that has been detected, from the ID included in the unauthorized activity detection data. Specifically, the connection control unit 916 identifies the MAC address of the transmission source of the unauthorized data that has been detected using a reception MAC address storage table stored in the storage unit 910. IDs of data, reception MAC addresses, and transmission ports are correlated in the reception MAC address storage table. Reception MAC addresses are MAC addresses of the transmission sources that have transmitted this data. Transmission ports are ports by which the data is transmitted from the first in-vehicle relay device 900. The reception MAC address storage table indicates the flow of data of various types of IDs from the transmission source to the transmission port that is the transmission destination. The MAC address storage table is recorded by the connection control unit 916.

FIG. 16 here illustrates an example of the MAC address storage table stored in the storage unit 910 of the first in-vehicle relay device 900 according to the second embodiment. The reception MAC address storage table 1100 is a table that lists sets of the ID included in reception data, the transmission source MAC address of the reception data (reception MAC address), and the port that transmits the reception data (transmission port), as illustrated in FIG. 16. For example, in a case where the ID included in the unauthorized activity detection data is "0x1A", the MAC address where the ID is "0x1A" can be identified as being "MAC address C" in the reception MAC address storage table 1100. That is to say, the transmission source MAC address of the unauthorized data that has been detected can be identified as being "MAC address C". Note that in the present embodiment, the reception MAC address storage table is stored in a non-volatile region that the storage unit 910 has in the present embodiment, but may be stored in a volatile region that the storage unit 910 has.

Returning to FIG. 15, next in step S2304, the connection control unit 916 sets relay permissible/non-permissible determining conditions to make relaying of data that has this MAC address as the destination or transmission source, i.e., to block, after having identified the transmission source MAC address of the unauthorized data. Multiple relay permissible/non-permissible determining conditions can be set with regard to multiple MAC addresses, and the connection control unit 916 stores the set relay permissible/non-permissible determining conditions in the storage unit 910.

Next, in step S2306, the connection control unit 916 determines whether self-driving functions off data has been received or not. In a case where self-driving functions off data is found to have been received as a result of the determination (Yes in step S2306), the connection control unit 916 performs the processing of step S2308. In a case where self-driving functions off data is found to have not been received as a result of the determination (No in step S2306), the connection control unit 916 returns to the processing of step S2306.

In step S2308, the connection control unit 916 changes the relay permissible/non-permissible determining conditions in accordance with the data destination MAC address and the transmission source MAC address. Specifically, in a case where the data destination MAC address or the transmission source MAC address is the MAC address of the communication unit 136 or analysis interface 138, the connection control unit 916 sets the relay permissible/non-permissible determining conditions to relay to this MAC address even if this data is unauthorized data.

Thus, in a case where unauthorized activity has been detected, the first in-vehicle relay device 900 suppresses effects of unauthorized in-vehicle equipment that has been detected on other equipment, by not relaying data related to the MAC address of the transmission source of the unauthorized data that has been detected. Further, in a state where the self-driving functions are in an off state which can be conceived as safety having been secured, the first in-vehicle relay device 900 enables the unauthorized data to access the communication unit 136 and/or analysis interface 138, whereby analysis of the unauthorized activity and updating can be performed. Accordingly, the unauthorized in-vehicle equipment such as an ECU or the like is analyzed, firmware is updated as necessary, and can be returned to a normal state. After having returned the in-vehicle equipment to a normal state, restriction cancellation request data is sent to the first in-vehicle relay device 900 via the analysis interface 138, whereby the first in-vehicle relay device 900 clears the relay permissible/non-permissible determining conditions that had been set due to reception of the unauthorized activity detection data, so as to return to the state before the detection of unauthorized activity. The restriction cancellation request data has been described as being sent from the analysis interface 138 in the present embodiment, but may be sent by other routes.

Figure 17:
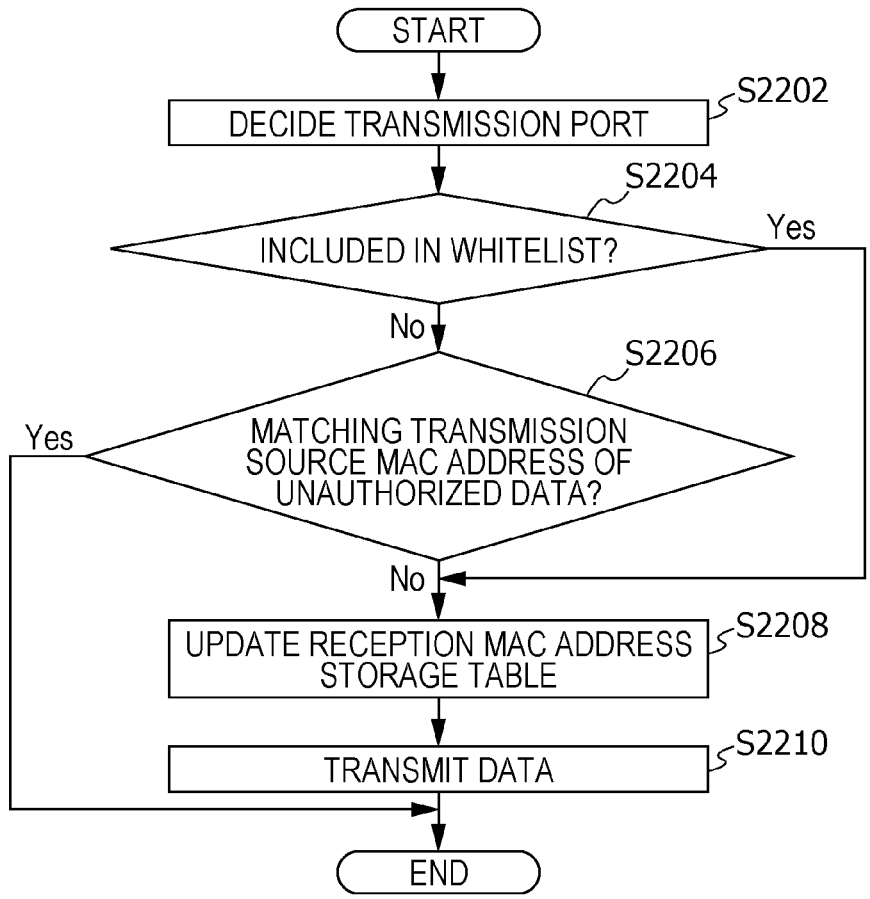
FIG. 17 is a flowchart illustrating an example of normal transfer processing by the first in-vehicle relay device according to the second embodiment.

Next, details of the normal transfer processing in step S1004 in FIG. 14 will be described. FIG. 17 is a flowchart illustrating an example of normal transfer processing by the first in-vehicle relay device 900 according to the second embodiment.

First, in step S2202, the connection control unit 916 decides a port for transmission of reception data, using the destination MAC address included in the header of the reception data, using the MAC address conversion table 800 such as illustrated in FIG. 10 that is stored in the storage unit 910.

The connection control unit 916 then in step S2204 determines whether the destination MAC address is a MAC address set in a whitelist beforehand where relay-permissible MAC addresses are listed. In a case where the destination MAC address is listed in the whitelist (Yes in step S2204), the connection control unit 916 performs the processing of step S2208. In a case where the destination MAC address is not listed in the whitelist (No in step S2204), the connection control unit 916 performs the processing of step S2206. Note that the whitelist is a list of transmission source MAC addresses and destination MAC addresses regarding which relay is permissible. The whitelist is set beforehand and stored in the storage unit 910. An arrangement may be made where the connection control unit 916 relays data of MAC addresses listed in the whitelist, regardless of whether the data includes unauthorized activity or not. Examples of a whitelist include a MAC address of which the communication unit 136 is the transmission source or destination, a MAC address of which the analysis interface 138 is the transmission source or destination, and so forth. The whitelist is set beforehand, and for example, may be written to the storage unit 910 or the like at the time of factory shipping of the first in-vehicle relay device 900 or equipment or a system including the first in-vehicle relay device 900, or at the time of installation in an automobile.

In step S2206, the connection control unit 916 determines whether the destination MAC address matches the transmission source MAC address of unauthorized data. In a case of matching (Yes in step S2206), the connection control unit 916 ends the processing. In a case of not matching (No in step S2206), the connection control unit 916 performs the processing of step S2208.

In step S2208, the connection control unit 916 updates the reception MAC address storage table 1100 as illustrated in FIG. 16. Note that in a case where the capacity of the storage unit 910 is limited, the connection control unit 916 may be configured to store in the storage unit 910 with priority on new content of the reception MAC address storage table 1100. Alternatively, the connection control unit 916 may restrict the number of sets of "transmission port—ID—reception MAC address" that are stored.

The connection control unit 916 then in step S2210 transmits the reception data from the transmission port decided in step S2202.

Figure 18:
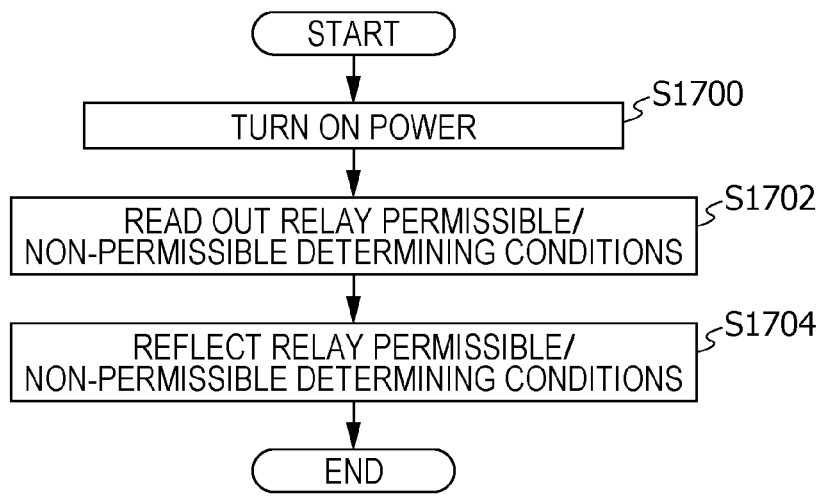
FIG. 18 is a flowchart illustrating an example of relay permissibility determination conditions reflecting processing at the time of turning the power of the first in-vehicle relay device according to the second embodiment.

When setting and clearing the relay permissible/non-permissible determining conditions, the connection control unit 916 records the relay permissible/non-permissible determining conditions in the storage unit 910. When the power of the first in-vehicle relay device 900 according to the present embodiment is turned off after changing relay permissible/non-permissible determining conditions, and the power is thereafter turned on again, the relay permissible/non-permissible determining conditions before turning off the power are reflected. Processing for reflecting the relay permissible/non-permissible determining conditions before turning off the power of the first in-vehicle relay device 900 when turning on the power again will be described with reference to FIG. 18. FIG. 18 is a flowchart illustrating an example of reflecting processing of relay permissible/non-permissible determining conditions at the time of turning on the power of the first in-vehicle relay device 900 according to the second embodiment.

First, the power of the first in-vehicle relay device 900 is turned on in step S1700. Next, in step S1702, the connection control unit 916 reads out the relay permissible/non-permissible determining conditions from the storage unit 910. Then in step S1704, the connection control unit 916 sets the relay permissible/non-permissible determining conditions based on the relay permissible/non-permissible determining conditions that have been read out, and reflects the relay permissible/non-permissible determining conditions of the state before having turned the power off.

According to the above, the relay permissible/non-permissible determining conditions of the first in-vehicle relay device 900 can be returned to the same state before having turned off the power, even after the power has been turned off and then turned on again. Accordingly, even if the power of the first in-vehicle relay device 900 has been turned off due to the engine stopping or the like after the relay permissible/non-permissible determining conditions settings having been changed due to detection of unauthorized activity, reversion to the initial state does not occur, and unauthorized data can be prevented from being relayed via the first in-vehicle relay device 900.

Note that the configuration of the in-vehicle network 2000 according to the second embodiment that is illustrated in FIG. 12 is but an example, and is not restricted to this, as long as a configuration that includes the first in-vehicle relay device 900 and a configuration of detecting unauthorized activity such as the unauthorized activity detection device 920 or the like. For example, an arrangement may be made where all networks, including the network to which the control ECUs such as brake ECUs and so forth are connected, are configured of Ethernet (registered trademark) networks. In this case, a configuration may be made where unauthorized activity detection data lists a transmission source MAC address regarding which connection change should be made, and the first in-vehicle relay device performs settings of relay permissible/non-permissible determining conditions based on the MAC address thereof.

The unauthorized activity detection data is not limited to being transmitted with the first in-vehicle relay device 900 as the destination, and may be transmitted with another ECU or the like as the destination, may be transmitted by multicast, and may be transmitted by broadcast. In a case of transmission by multicast or broadcast, the first in-vehicle relay device 900 transmits the unauthorized activity detection data that has been detected to other ECUs and so forth.

Although in-vehicle equipment, networks, equipment, and out-of-vehicle equipment are included as components in the in-vehicle network 2000 according to the second embodiment, components are not restricted to these. The in-vehicle network 2000 may be configured including other in-vehicle equipment, networks, equipment, and out-of-vehicle equipment. The in-vehicle network 2000 also has been described as a configuration having the ADAS ECU 130, but may have an ECU capable of handling more sophisticated self-driving functions instead of ADAS functions.

Upon receiving unauthorized activity detection data, the first in-vehicle relay device 900 according to the second embodiment described above can stop transfer of data as to the MAC address that is the transmission source of the unauthorized data by changing permissibility of relaying, by changing the relay permissibility regarding the transmission source MAC address of the unauthorized data corresponding to the unauthorized activity detection data, and thereby suppress an attack such as unauthorized control of in-vehicle equipment such as the ECU or the like that has transmitted the unauthorized data, and so forth. Further, the first in-vehicle relay device 900 can suppress other equipment such as ECUs from being affected by changing permissibility of relaying.

Also, the reception MAC address storage table according to the second embodiment stores sets of IDs, reception MAC addresses, and transmission ports, and thereby can store multiple information regarding the same transmission port. Also, even in a case where other data has been relayed by the first in-vehicle relay device 900 after having received the unauthorized data but before receiving the unauthorized activity detection data, the MAC address of the unauthorized data can be identified by referencing the reception MAC address storage table. Accordingly, in a case where detection of unauthorized activity requires time, and reception of unauthorized activity detection information requires time as well, the first in-vehicle relay device 900 can still handle the situation retrospectively.

Figure 19:
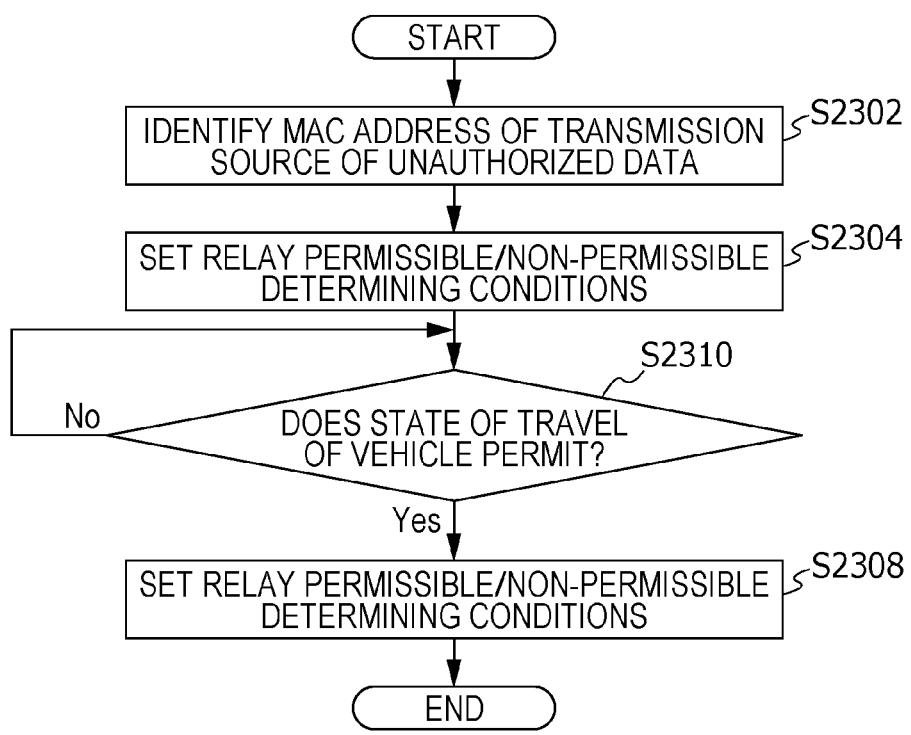
FIG. 19 is a flowchart illustrating a modification of relay permissibility determination processing by the first in-vehicle relay device according to the second embodiment.

The first in-vehicle relay device 900 according to the second embodiment may also take into consideration the state of traveling of the vehicle in which the first in-vehicle relay device 900 is installed in the relay permissible/non-permissible determining conditions setting processing in step S1008. For example, the connection control unit 916 may perform determining processing of step S2310 in FIG. 19, instead of step S2306. FIG. 19 is a flowchart illustrating a modification of the relay permissible/non-permissible determining conditions setting processing by the first in-vehicle relay device 900 according to the second embodiment. In step S2310, the connection control unit 916 determines whether the traveling state of the vehicle is a state where relay permissible/non-permissible determining conditions can be changed, i.e., whether or not the vehicle is in a traveling state, before changing the relay permissible/non-permissible determining conditions in step S2308. In a case of a changeable state (Yes in step S2310), the connection control unit 916 performs the processing of step S2308. In a case of a not changeable state (No in step S2310), the connection control unit 916 returns to the processing of step S2310. Requisites for the traveling state of the vehicle to be in a state where relay permissible/non-permissible determining conditions can be changed may include that the self-driving functions are in an off state. The connection control unit 916 may determine that the traveling state of the vehicle is in a state where relay permissible/non-permissible determining conditions can be changed in a case where at least one of the above requisites is satisfied.

The processing of step S2310 may be performed between step S2302 and step S2304. In this case, the connection control unit 916 determines whether or not the traveling state of the vehicle is a state where relay permissible/non-permissible determining conditions can be changed before changing the relay permissible/non-permissible determining conditions in step S2304, and change relay permissible/non-permissible determining conditions in accordance with the results of the determining.

As described above, the first in-vehicle relay device 900 blocks relay of data of a transmission source of unauthorized data, or sets relay permissible/non-permissible determining conditions so that access of the unauthorized data is enabled at the communication unit 136 and analysis interface 138, in accordance with the traveling state of the vehicle. Accordingly, situations where traveling of the vehicle becomes unstable due to blocking and changing relay of data can be suppressed.

Third Embodiment

An in-vehicle relay device according to a third embodiment will be described next. A first in-vehicle relay device 1200 that is an in-vehicle relay device according to the third embodiment differs from the second embodiment with regard to the point of being connected to the ADAS ECU via a second in-vehicle relay device. The third embodiment will be described below, primarily with regard to points that differ from the first and second embodiments.

Figure 20:
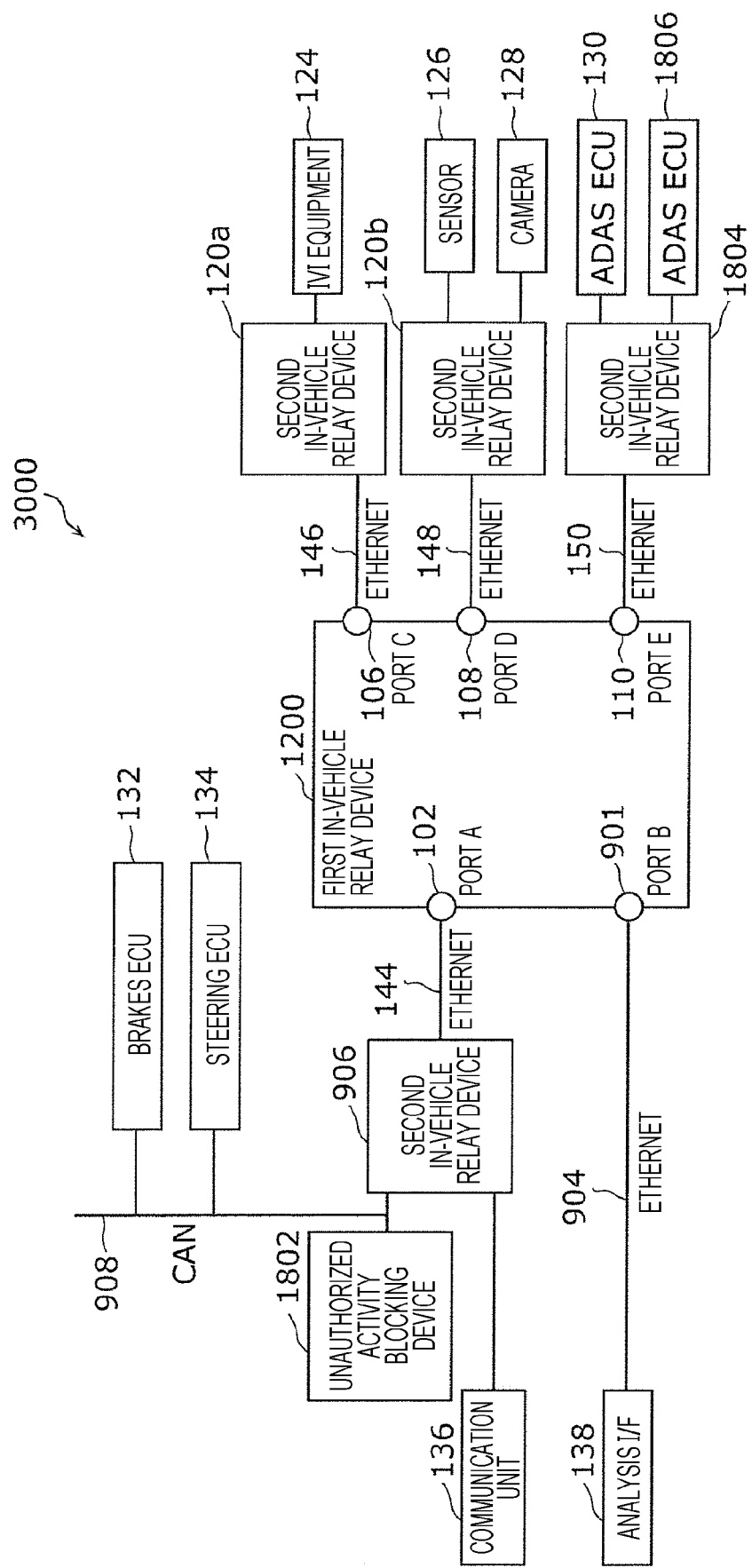
FIG. 20 is a block diagram illustrating an example of the functional configuration of an in-vehicle network that has a first in-vehicle relay device according to a third embodiment.

FIG. 20 is a block diagram illustrating an example of the functional configuration of an in-vehicle network 3000 that has the first in-vehicle relay device 1200 according to the third embodiment. As illustrated in FIG. 20, the in-vehicle network 3000 has the first in-vehicle relay device 1200, second in-vehicle relay devices 120a, 120b, 906, and 1804, the IVI equipment 124, sensor 126, camera 128, ADAS ECUs 130 and 1806, brakes ECU 132, steering ECU 134, communication unit 136, analysis interface 138, and an unauthorized activity blocking device 1802, as components. The in-vehicle network 3000 further includes, as networks connecting the above components, the CAN 908, and Ethernet (registered trademark) cables 144, 146, 148, 150, and 904.

In the in-vehicle network 3000, the unauthorized activity blocking device 1802 is connected to the CAN 908, and monitors data on the CAN 908. In a case of having detected unauthorized activity with regard to data, the unauthorized activity blocking device 1802 invalidates data using error frames.

The ADAS ECUs 130 and 1806 are connected to the first in-vehicle relay device 1200 via the second in-vehicle relay device 1804. For example, the ADAS ECU 130 has parking assist functions, and the ADAS ECU 1806 has cruise control functions. The ADAS ECUs 130 and 1806 are assigned ADAS functions.

The second in-vehicle relay device 1804 is provided with router functions, for example, and performs conversion of MAC addresses recorded in data headers when relaying data. The second in-vehicle relay device 1804 converts the transmission source MAC addresses of data transmitted from the ADAS ECUs 130 and 1806 from MAC addresses of the ADAS ECU 130 and MAC addresses of the ADAS ECU 1806 into MAC addresses of the second in-vehicle relay device 1804. Accordingly, when data is received at the port E 110 of the first in-vehicle relay device 1200, the transmission source MAC address of the data is the MAC address of the second in-vehicle relay device 1804. Thus, which of the ADAS ECUs 130 and 1806 that the reception data at the port E 110 has been transmitted from cannot be distinguished from the MAC address. Accordingly, the second in-vehicle relay device 1804 uses an Internet Protocol (IP) address recorded in the header of the data to distinguish data transmitted from the ADAS ECUs 130 and 1806. The object of connection of the port B 901, port C 106, and port D 108 are the same as in the second embodiment.

Figure 21:
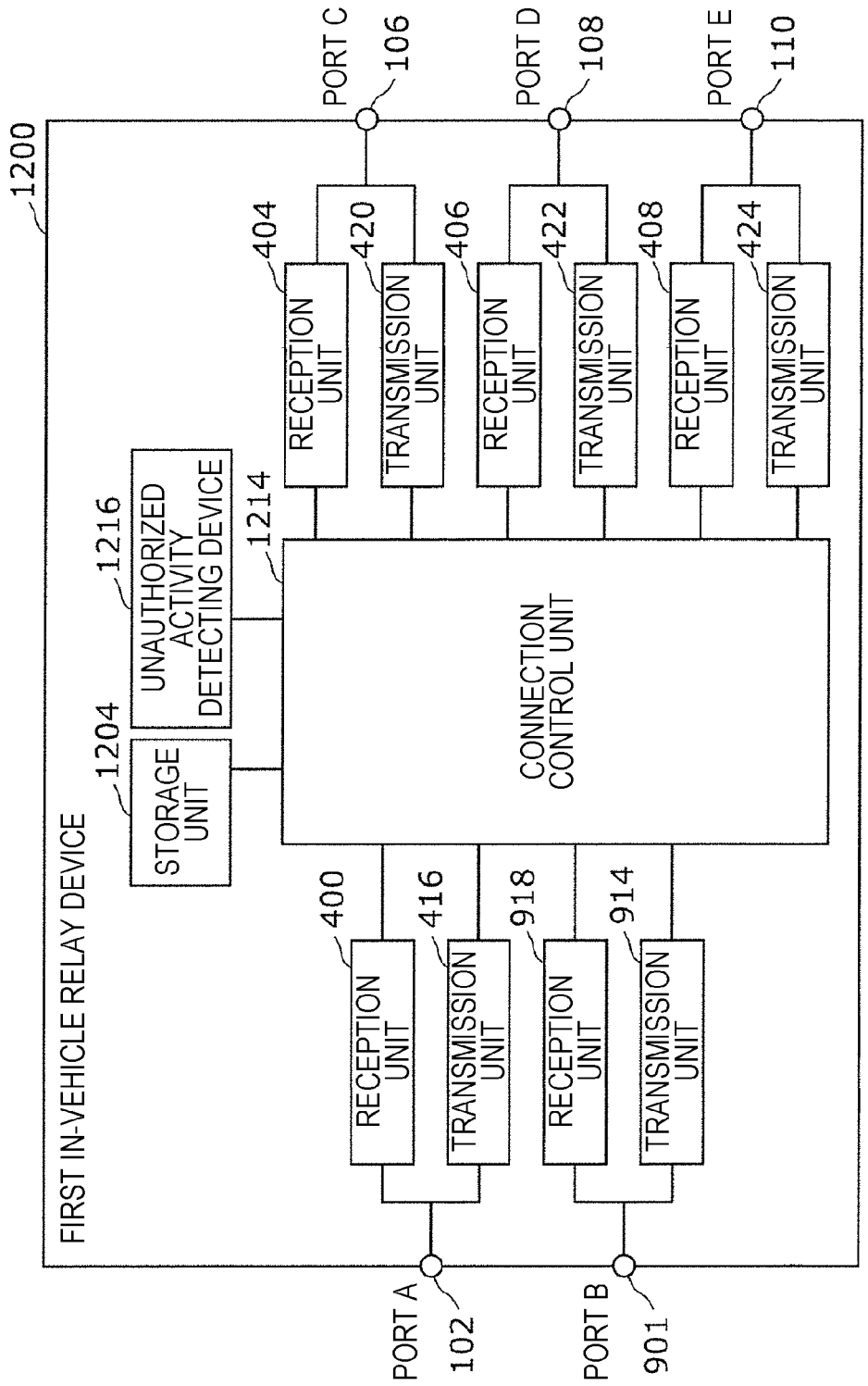
FIG. 21 is a block diagram illustrating an example of the functional configuration of a first in-vehicle relay device according to the third embodiment.

The configuration of the first in-vehicle relay device 1200 will be described. FIG. 21 is a block diagram illustrating an example of the functional configuration of the first in-vehicle relay device 1200 according to the third embodiment. The first in-vehicle relay device 1200 has the reception unit 400 and transmission unit 416 for the port A 102, the reception unit 918 and transmission unit 914 for the port B 901, the reception unit 404 and transmission unit 420 for the port C 106, the reception unit 406 and transmission unit 422 for the port D 108, and the reception unit 408 and transmission unit 424 for the port E 110, a storage unit 1204, a connection control unit 1214, and an unauthorized activity detecting device 1216, as illustrated in FIG. 21.

The reception units 400, 918, 404, 406, and 408, and the transmission units 416, 914, 420, 422, and 424, have the same configuration as in the second embodiment. The storage unit 1204 has the same configuration as the storage unit 410 in the first embodiment. The connection control unit 1214 performs relay control and connection control among the ports, confirmation of destinations of received data, format conversion of data, reception of unauthorized activity detection data, reception of self-driving functions on/off data, reception of restriction cancellation request data, and so forth. The unauthorized activity detecting device 1216 monitors data relayed by the first in-vehicle relay device 1200, and detects unauthorized activity of data from cycles, IDs, formats, amount of change in data, and so forth.

Next, the operations of the first in-vehicle relay device 1200 according to the third embodiment will be described with reference to FIG. 22. Note that FIG. 22 is a flowchart illustrating an example of processing by the first in-vehicle relay device 1200 according to the third embodiment.

First, in step S1300, the first in-vehicle relay device 1200 receives data from one of the reception unit 400 of the port A 102, the reception unit 918 of the port B 901, the reception unit 404 of the port C 106, the reception unit 406 of the port D 108, or the reception unit 408 of the port E 110.

Next, in step S1302, the connection control unit 1214 determines whether or not the received data is addressed to itself, i.e., data addressed to the first in-vehicle relay device 1200, from the destination MAC address of the reception data. If not data addressed to itself (No in step S1302), the connection control unit 1214 performs the processing of step S1304. If data addressed to itself (Yes in step S1302), the connection control unit 1214 performs the processing of step S1306.

In step S1304, the connection control unit 1214 performs the later-described normal transfer processing.

In step S1306, the connection control unit 1214 determines whether or not reception data is restriction cancellation request data for requesting cancellation of restriction on relay blocking as to a predetermined IP address. In a case where the reception data is restriction cancellation request data (Yes in step S1306), the connection control unit 1214 performs the processing of step S1308. In a case where the reception data is not restriction cancellation request data (No in step S1306), the connection control unit 1214 performs the processing of step S1310.

In step S1308, the connection control unit 1214 clears the relay permissible/non-permissible determining conditions for determining whether or not relaying of data is permissible to the IP address specified in the restriction cancellation request data.

In step S1310, the connection control unit 1214 determines whether or not the reception data is self-driving functions off data. In a case where the reception data is self-driving functions off data (Yes in step S1310), the connection control unit 1214 performs the processing of step S1312. In a case where the reception data is not self-driving functions off data (No in step S1310), the connection control unit 1214 performs the processing of step S1314.

In step S1312, the connection control unit 1214 notifies within the connection control unit 1214 that the self-driving functions are in an off state.

In step S1314, the reception data is a normal control packet, so the connection control unit 1214 performs processing in accordance with the control contents of the reception data.

Next, details of normal transmission processing in step S1304 will be described with reference to FIG. 23. FIG. 23 is a flowchart illustrating an example of normal transmission processing of the first in-vehicle relay device 1200 according to the third embodiment.

First, in step S2402, the connection control unit 1214 decides a port for transmission of reception data, using the destination MAC address included in the header of the reception data, using the MAC address conversion table 800 such as illustrated in FIG. 10 that is stored in the storage unit 1204.

The connection control unit 1214 then in step S2404 determines whether the destination IP address included in the header of the reception data is an IP address listed in a whitelist where relay-permissible IP addresses are listed. In a case where the destination IP address is listed in the whitelist (Yes in step S2404), the connection control unit 1214 performs the processing of step S2408. In a case where the destination IP address is not listed in the whitelist (No in step S2404), the connection control unit 1214 performs the processing of step S2406. Note that the whitelist is a list of transmission source IP addresses and destination IP addresses regarding which relay is permissible. The whitelist is set beforehand and stored in the storage unit 1204. An arrangement may be made where the connection control unit 1214 relays data of IP addresses listed in the whitelist, regardless of whether the data includes unauthorized activity or not. Examples of a whitelist include an IP address of which the communication unit 136 is the transmission source or destination, an IP address of which the analysis interface 138 is the transmission source or destination, and so forth.

In step S2406, the connection control unit 1214 determines whether the destination IP address or transmission source IP address included in the header of the reception data matches any IP address of transmission source of unauthorized data stored in the storage unit 1204 as relay permissible/non-permissible determining conditions. In a case of matching (Yes in step S2406), the connection control unit 1214 ends the processing. In a case of not matching (No in step S2406), the connection control unit 1214 performs the processing of step S2408.

In step S2408, the connection control unit 1214 updates the reception IP address storage table. The reception IP address storage table correlates the ID of the data, reception IP address, and transmission port. The reception IP address is the transmission source IP address that has transmitted this data. The transmission port is a port by which this data is transmitted from the first in-vehicle relay device 1200. The reception IP address storage table indicates the flow of data of various types of IDs from the transmission source to the transmission port that is the transmission destination. The reception IP address table is recorded by the connection control unit 1214.

Now, FIG. 24 illustrates an example of the reception IP address storage table stored in the storage unit 1204 of the first in-vehicle relay device 1200 according to the third embodiment. The reception IP address storage table 1400 is a table that lists sets of the ID included in the reception data, IP address of the transmission source of the reception data (reception IP address), and the port that transmits the reception data (transmission port), as illustrated in FIG. 24. In a case where the capacity of the storage unit 1204 is limited, the connection control unit 1214 may store in the storage unit 1204 with priority on new content of the reception IP address storage table 1400. Alternatively, the connection control unit 1214 may restrict the number of sets of "transmission port—ID—reception IP address" that are stored for each transmission port.

The connection control unit 1214 then in step S2410 transmits the reception data from the transmission port decided in step S2402.

Next, unauthorized activity detection operations of the unauthorized activity detecting device 1216 of the first in-vehicle relay device 1200 will be described with reference to FIG. 25. FIG. 25 is a flowchart illustrating an example of unauthorized activity detecting processing by the first in-vehicle relay device 1200 according to the third embodiment.

First, in step S1502, the unauthorized activity detecting device 1216 detects unauthorized activity in reception data. The unauthorized activity detecting device 1216 transmits unauthorized activity detection data to the connection control unit 1214.

Next, in step S1504 the connection control unit 1214 starts an unshown change standby timer of the first in-vehicle relay device 1200, and starts timing.

Then in step S1506, the connection control unit 1214 identifies a transmission source IP address that has transmitted unauthorized data, from the ID included in the unauthorized activity detection data. Specifically, the connection control unit 1214 identifies the transmission source IP address that has transmitted the unauthorized data, by matching the ID included in the unauthorized activity detection data using the reception IP address storage table 1400 such as illustrated in FIG. 24, that is stored in the storage unit 1204.

Next, in step S1508, the connection control unit 1214 determines whether the timer value of the change standby timer is greater than a predetermined value (timer value>predetermined value) or not. In a case where the timer value is found to be greater than the predetermined value as the result of the determination (Yes in step S1508), the connection control unit 1214 performs the processing of step S1512. In a case where the timer value is found to be not greater than the predetermined value as the result of the determination (No in step S1508), the connection control unit 1214 performs the processing of step S1510.

In step S1510, the connection control unit 1214 determines whether self-driving functions off data has been received or not. In a case where self-driving functions off data is found to have been received as a result of the determination (Yes in step S1510), the connection control unit 1214 performs the processing of step S1512. In a case where self-driving functions off data is found to have not been received as a result of the determination (No in step S1510), the connection control unit 1214 returns to the processing of step S1508.

In step S1512, the connection control unit 1214 sets relay permissible/non-permissible determining conditions to make relaying of data that has the transmission source IP address in the unauthorized activity detection data as the destination or transmission source impermissible, i.e., to block. Multiple relay permissible/non-permissible determining conditions can be set with regard to multiple IP addresses, and the connection control unit 1214 stores the set relay permissible/non-permissible determining conditions in the storage unit 1204.

Then in step S1514 the connection control unit 1214 stops the change standby timer, and clears the timer value of the change standby timer to "0", for example.

While the connection control unit 1214 uses the reception IP address storage table 1400 to identify transmission source IP addresses of the unauthorized data from the ID included in the unauthorized activity detection data in the present embodiment, this is not restrictive. For example, an arrangement may be made where the unauthorized activity detection data includes the transmission source IP address of the unauthorized data, and the connection control unit 1214 sets the relay permissible/non-permissible determining conditions based on the transmission source IP address included in the unauthorized activity detection data.

Also, the connection control unit 1214 uses a MAC address to determine whether the reception data is addressed to itself, and to decide the transmission destination port of the reception data in the present embodiment, but this is not restrictive. For example, the first in-vehicle relay device 1200 may have router functions, and decide the transmission destination port using the IP address of the reception data.

The first in-vehicle relay device 1200 according to the third embodiment described above can identify unauthorized in-vehicle equipment even in a case where the MAC address is changed by a router or the like on the route from the unauthorized in-vehicle equipment such as an ECU or the like to the first in-vehicle relay device 1200. Further, the first in-vehicle relay device 1200 can make only transmission/reception data of the unauthorized in-vehicle equipment to be the object of stopping relaying without stopping the relay of transmission/reception data other than that of unauthorized in-vehicle equipment. For example, the first in-vehicle relay device 1200 according to the present embodiment can distinguish and handle data transmitted from the ADAS ECU 130 and data transmitted from the ADAS ECU 1806.

Also, the first in-vehicle relay device 1200 has the unauthorized activity detecting device 1216, and accordingly can transmit and receive unauthorized activity detection data without being affected by the unauthorized in-vehicle equipment such as an ECU or the like, and can execute processing following detection of unauthorized activity in a sure manner.

Figure 26:
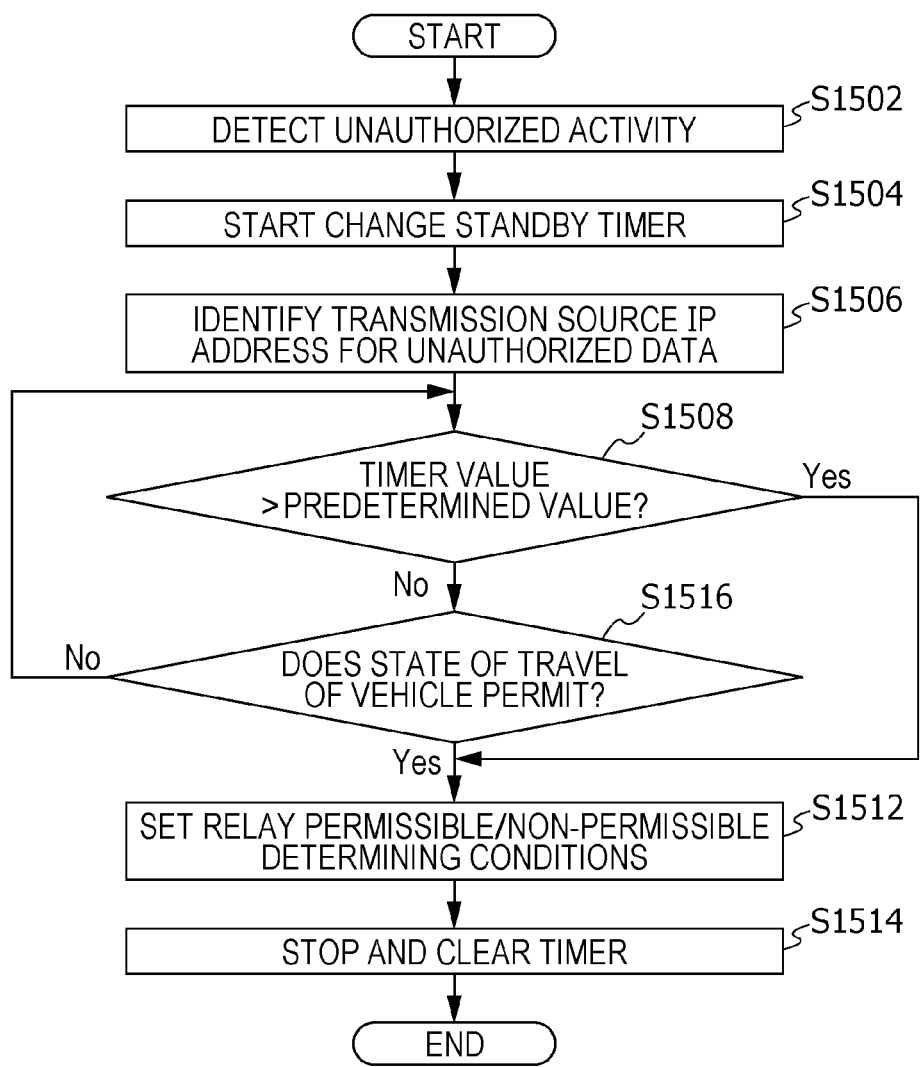
FIG. 26 is a flowchart illustrating a modification of unauthorized activity detecting processing by the first in-vehicle relay device according to the third embodiment.

Also, the first in-vehicle relay device 1200 according to the third embodiment may also take into consideration the state of traveling of the vehicle in which the first in-vehicle relay device 1200 is installed in the unauthorized activity detection processing. For example, the connection control unit 1214 may perform determining processing of step S1516 in FIG. 26, instead of step S1510. FIG. 26 is a flowchart illustrating a modification of the unauthorized activity detection processing by the first in-vehicle relay device 1200 according to the third embodiment. In step S1516, the connection control unit 1214 determines whether or not the traveling state of the vehicle is a state where relay permissible/non-permissible determining conditions can be changed, i.e., whether or not the vehicle is in a traveling state, before changing the relay permissible/non-permissible determining conditions. In a case of a changeable state (Yes in step S1516), the connection control unit 1214 performs the processing of step S1512. In a case of a not changeable state (No in step S1516), the connection control unit 1214 returns to the processing of step S1508. Requisites for the traveling state of the vehicle to be in a state where relay permissible/non-permissible determining conditions can be changed may include that the self-driving functions are in an off state. The connection control unit 1214 may determine that the traveling state of the vehicle is in a state where relay permissible/non-permissible determining conditions can be changed in a case where at least one of the above requisites is satisfied. As described above, the first in-vehicle relay device 1200 sets relay permissible/non-permissible determining conditions to block relay of data of the transmission source of the unauthorized data. Accordingly, situations where traveling of the vehicle becomes unstable due to blocking relay of data can be suppressed.

Other Modifications

Although an in-vehicle device and so forth according to one or multiple forms have been described by way of embodiments and modifications, the present disclosure is not restricted to these embodiments and modifications. Modifications conceivable by one skilled in the art made to the embodiments and modifications, and forms constructed by combining components of different embodiments and modifications, without departing from the essence of the present disclosure, may also be included in one or multiple forms.

For example, the number of ports that the first in-vehicle relay device is provided with has been described as being five in the embodiments and modifications, but this is not restrictive. It is sufficient for the number of ports that the first in-vehicle relay device is provided with to be two or more.

Also, the network connected to the first in-vehicle relay device has been described as being at least one of CAN and Ethernet (registered trademark) in the embodiments and modifications, but this is not restrictive. The network connected to the first in-vehicle relay device may be another network standard such as Media Oriented System Transport (MOST), Local Interconnect Network (LIN), FlexRay, or the like. Alternatively, the first in-vehicle relay device may be connected to in-vehicle equipment without going through a network.

Also, the three types of processing at the first in-vehicle relay device, which are changing port connections, setting relay permissible/non-permissible determining conditions using MAC addresses, and setting relay permissible/non-permissible determining conditions using IP addresses, have been separately described in the embodiments and modifications, but the first in-vehicle relay device may combine and carry out at least two of the three types of processing. For example, the first in-vehicle relay device may select and carry out the three types of processing in accordance with the in-vehicle equipment that is the transmission source of unauthorized data, and the network to which this in-vehicle equipment is connected.

Also, the second in-vehicle relay device 1804 connected to the port E 110 of the first in-vehicle relay device 1200 in the third embodiment may be applied to the port E 110 of the first in-vehicle relay device according to the first and second embodiments and modifications.

The first in-vehicle relay device 100 according to the first embodiment and modification may omit timing by the change standby timer in the port connection changing processing. In this case, the processing of step S2102, step S2106, and step S2112, in FIG. 4 and FIG. 11, may be omitted. Also, the first in-vehicle relay device 1200 according to the third embodiment and modification may omit timing by the change standby timer in the unauthorized activity detection processing. In this case, the processing of step S1504, step S1508, and step S1514, in FIG. 25 and FIG. 26, may be omitted. In either case, upon receiving a self-driving functions off notification, or in accordance with the traveling state of the vehicle, the first in-vehicle relay device performs changing of port connections or settings of relay permissible/non-permissible determining conditions.

Also, the unauthorized activity detection devices according to the first and second embodiments may be used instead of the unauthorized activity blocking device 1802 connected to the port A 102 of the first in-vehicle relay device 1200 according to the third embodiment. In the same way, the unauthorized activity blocking device 1802 may be used instead of the unauthorized activity detection devices according to the first and second embodiments.

While the technology according to the present disclosure has been described as security measures in an in-vehicle network installed in an automobile in the above embodiments and modifications, the scope of application of the technology according to the present disclosure is not restricted to this. The present disclosure may be applied not only to automobiles but also mobility entities, such as construction equipment, farming equipment, ships, railways, aircraft, and mobile vehicles.

As described above, the technology according to the present disclosure may be realized as a system, a device, a method, an integrated circuit, a computer program, or a recording medium such as a computer-readable recording disk or the like, and may be realized by any selective combination of system, device, method, integrated circuit, computer program, and recording medium. The computer-readable recording medium includes non-volatile recording media such as CD-ROM or the like, for example.

The processing units included in the above-described embodiments and modifications typically are realized as an large scale integration (LSI), which is an integrated circuit, for example. These may be individually formed into one chip, or part or all may be included in one chip.

Circuit integration is not restricted to LSIs, and dedicated circuits or general-purpose processors may be used to realize the same. An field programmable gate array (FPGA) which can be programmed after manufacturing the LSI, or a reconfigurable processor where circuit cell connections and settings within the LSI can be reconfigured, may be used.

Note that the components in the above-described embodiments and modifications may be configured of dedicated hardware, or may be realized by executing software programs suitable for the components. The components may be realized by a program executing unit such as a processor like a CPU or the like reading out and executing software programs recorded in a storage medium such as a hard disk or semiconductor memory or the like.

Part or all of the above-described components may be configured as an integrated circuit (IC) card that is detachably mountable, or a standalone module. The IC card or module is a computer system configured including a microprocessor, ROM, RAM, and so forth. The IC card or module may include the above-described LSI or super LSI. The IC card or module achieves its functions by the microprocessor operating according to the computer program. The IC card or module may be tamper-resistant.

The relay method according to the present disclosure may be realized by a processor such as a microprocessor unit (MPU) or CPU or the like, a circuit such as an LSI, an IC card or standalone module, or the like.

Further, the technology according to the present disclosure may be realized by a software program or digital signals made up of a software program, or may be a non-transitory computer-readable recording medium in which the program has been recorded. It is needless to say that the above program can be distributed via a transmission medium such as the Internet or the like.

Also, numbers such as ordinal numbers, numerical quantities, and so forth used above, are all exemplary, for specific explanation of the technology according to the present disclosure, and the present disclosure is not restricted to the numbers that have been exemplified. Also, connection relations among components are exemplary for specific explanation of the technology according to the present disclosure, and connection relations for realizing the functions of the present disclosure are not restricted to these.

Also, the divisions of functional blocks in the block diagrams are exemplary, and multiple functional blocks may be realized as a single functional block, a single functional block may be divided in to multiple, and a part of functions may be moved to a different functional block. Further, functions of multiple functional blocks having similar functions may be processed in parallel or time-division by a single hardware or software.

Technology according to the present disclosure has functions of controlling connections in accordance with detection of unauthorized activity, and is useful in a security-enabled in-vehicle network and so forth. The technology according to the present disclosure is also applicable to uses such as industrial networks and the like.

What is claimed is:

1. A system for a vehicle, the module comprising:
   a first electronic control unit (ECU) that transmits and receives first data to and from a first in-vehicle module in the vehicle;
   a second ECU that transmits and receives second data to and from a second in-vehicle module in the vehicle; and
   a control circuit that controls relay of third data among the first ECU and the second ECU,
   wherein the control circuit determines whether reception data received by the control circuit from the first ECU or the second ECU is unauthorized,
   the control circuit determines whether a traveling state of the vehicle satisfies a predetermined condition in response to the reception data being unauthorized,
   the control circuit stops relaying the third data in response to the reception data being unauthorized and the traveling state of the vehicle satisfying the predetermined condition, and
   the traveling state of the vehicle, for satisfying the predetermined condition, includes at least one of (a) the vehicle being stopped, (b) a vehicle speed being at or below a predetermined speed, (c) brakes being applied, (d) a hazard indicator being on, (e) a driver being in a state capable of driving, or (f) self-driving functions being in an off state.

2. The system according to claim 1,
wherein at least one of the first ECU and the second ECU transmits and receives to and from a plurality of in-vehicle modules in the vehicle, via a network.

3. The system according to claim 1, further comprising:
a first port for connection of the first ECU and the first in-vehicle module; and
a second port for connection of the second ECU and the second in-vehicle module;
wherein the control circuit stops the relaying by blocking a connection between the first port and the second port.

4. The system according to claim 1,
wherein the third data, of which the control circuit stops the relaying, includes a MAC address of which a destination or a transmission source is the first in-vehicle module or the second in-vehicle module that is a source of the reception data that is unauthorized.

5. The system according to claim 1,
wherein the third data, of which the control circuit stops the relaying, includes an IP address of which a destination or a transmission source is the first in-vehicle module or the second in-vehicle module that is a source of the reception data that is unauthorized.

6. The system according to claim 1,
wherein the control circuit
receives, from the first ECU or the second ECU, unauthorized activity detection data notifying that the reception data is unauthorized, and
stops the relaying after a predetermined amount of time has elapsed following a reception of the unauthorized activity detection data.

7. The system according to claim 6,
wherein the unauthorized activity detection data includes information of data regarding an unauthorized activity that has been detected, and information of a transmission source of the data regarding the unauthorized activity that has been detected.

8. The system according to claim 7, further comprising:
a memory that stores, in a correlated manner, the information of the data regarding the unauthorized activity that has been detected, and the information of the transmission source of the data regarding the unauthorized activity that has been detected,
wherein the control circuit identifies the transmission source of the data regarding the unauthorized activity that has been detected, based on the information of the data regarding the unauthorized activity that has been detected and the information of the transmission source of the data regarding the unauthorized activity that has been detected which are stored in the memory.

9. The system according to claim 1,
wherein the vehicle includes the self-driving functions, and
the control circuit:
receives, from the first ECU or the second ECU, unauthorized activity detection data notifying that the reception data is unauthorized; and
stops the relaying upon receiving data notifying, as the traveling state of the vehicle, that the self-driving functions are in the off state, following a reception of the unauthorized activity detection data.

10. The system according to claim 1, further comprising:
a third ECU that transmits and receives fourth data to and from a third in-vehicle module in the vehicle,
wherein the control circuit, in a second case where the reception data is received from the first ECU and is unauthorized,
stops the relaying of the third data between the first ECU and the second ECU, and
continues relaying of fifth data between the first ECU and the third ECU.

11. The system according to claim 10,
wherein a diagnostics module that diagnosis a state of the first in-vehicle module is connected to the third in-vehicle module.

12. The system according to claim 10,
wherein the third in-vehicle module is a communication module an ECU that is configured for external communication from the vehicle.

13. The system according to claim 1,
wherein the control circuit, in a case where the reception data received from the first ECU or the second ECU is unauthorized, resumes the relaying upon receiving, from the first ECU or the second ECU, data requesting cancellation of stopping the relaying.

14. The system according to claim 1, further comprising:
a memory that stores a relay state of the relaying of the third data,
wherein, at a time of turning on power of the system, the control circuit maintains or stops relay of the third data based on the relay state stored in the memory.

15. A relay method, comprising:
transmitting and receiving first data to and from a first electronic control unit (ECU) in a vehicle;
transmitting and receiving second data to and from a second ECU in the vehicle;
relaying, via a control circuit, third data among the first ECU and the second ECU;
determining, by the control circuit, whether reception data received by the control circuit from the first ECU or the second ECU is unauthorized;
determining, by the control circuit, whether a traveling state of the vehicle satisfies a predetermined condition in response to the reception data being unauthorized; and
stopping, by the control circuit, the relaying of the third data in response to the reception data being unauthorized and the traveling state of the vehicle satisfying the predetermined condition,
wherein the traveling state of the vehicle, for satisfying the predetermined condition, includes at least one of (a) the vehicle being stopped, (b) a vehicle speed being at or below a predetermined speed, (c) brakes being applied, (d) a hazard indicator being on, (e) a driver being in a state capable of driving, or (f) self-driving functions being in an off state.

16. A non-transitory computer-readable medium including a program that causes a computer to
transmit and receive first data to and from a first electronic control unit (ECU) in a vehicle,
transmit and receive second data to and from a second ECU in the vehicle,
relay, via a control circuit, third data among the first ECU and the second ECU,
determine, by the control circuit, whether reception data received by the control circuit from the first ECU or the second ECU is unauthorized,
determine, by the control circuit, whether a traveling state of the vehicle satisfies a predetermined condition in response to the reception data being unauthorized, and stop, by the control circuit, the relaying of the third data in response to the reception data being unauthorized and the traveling state of the vehicle satisfying the predetermined condition, wherein the traveling state of the vehicle, for satisfying the predetermined condition, includes at least one of (a) the vehicle being stopped, (b) a vehicle speed being at or below a predetermined speed, (c) brakes being applied, (d) a hazard indicator being on, (e) a driver being in a state capable of driving, or (f) self-driving functions being in an off state.

17. The system according to claim 1, wherein, in a case of determining that the predetermined condition is not satisfied after determining that the reception data is unauthorized, the control circuit does not stop the relaying of the third data.

18. The system according to claim 1, wherein the traveling state of the vehicle includes movement of the vehicle.

* * * * *

UNITED STATES PATENT AND TRADEMARK OFFICE
CERTIFICATE OF CORRECTION

PATENT NO. : 12,316,653 B2  
APPLICATION NO. : 18/376672  
DATED : May 27, 2025  
INVENTOR(S) : Yuishi Torisaki, Takamitsu Sasaki and Tomoyuki Haga Page 1 of 1

It is certified that error appears in the above-identified patent and that said Letters Patent is hereby corrected as shown below:

In the Claims

Column 36, Line 45 (Claim 1, Line 1): please change "the module comprising" to – the system comprising –

Signed and Sealed this  
Eighth Day of July, 2025

Coke Morgan Stewart  
*Acting Director of the United States Patent and Trademark Office*